United States Patent
Laszlo et al.

(10) Patent No.: US 11,625,611 B2
(45) Date of Patent: Apr. 11, 2023

(54) TRAINING ARTIFICIAL NEURAL NETWORKS BASED ON SYNAPTIC CONNECTIVITY GRAPHS

(71) Applicant: X Development LLC, Mountain View, CA (US)

(72) Inventors: Sarah Ann Laszlo, Mountain View, CA (US); Philip Edwin Watson, Santa Cruz, CA (US)

(73) Assignee: X Development LLC, Mountain View, CA (US)

( * ) Notice: Subject to any disclaimer, the term of this patent is extended or adjusted under 35 U.S.C. 154(b) by 482 days.

(21) Appl. No.: 16/731,331

(22) Filed: Dec. 31, 2019

(65) Prior Publication Data

US 2021/0201158 A1 Jul. 1, 2021

(51) Int. Cl.
*G06N 3/08* (2006.01)
*G06N 20/20* (2019.01)
(Continued)

(52) U.S. Cl.
CPC ............. *G06N 3/086* (2013.01); *G06K 9/623* (2013.01); *G06K 9/6296* (2013.01);
(Continued)

(58) Field of Classification Search
CPC ...... G06N 3/086; G06N 3/0454; G06N 3/084; G06N 20/20; G06N 3/0445; G06N 3/0481; G06K 9/623; G06K 9/6296
See application file for complete search history.

(56) References Cited

U.S. PATENT DOCUMENTS

| 5,687,286 A | 11/1997 | Bar-Yam |
| 5,832,183 A | 11/1998 | Shinohara et al. |

(Continued)

FOREIGN PATENT DOCUMENTS

| DE | 102018201290 | 8/2019 |
| WO | WO 2019/081705 | 5/2019 |
| WO | WO 2019/222401 | 11/2019 |

OTHER PUBLICATIONS

PCT International Search Report and Written Opinion in International Appln. No. PCT/US2020/065943, dated May 3, 2021, 18 pages.

(Continued)

*Primary Examiner* — Jianxun Yang
(74) *Attorney, Agent, or Firm* — Fish & Richardson P.C.

(57) ABSTRACT

Methods, systems, and apparatus, including computer programs encoded on a computer storage medium, for training a student neural network. In one aspect, there is provided a method comprising: processing a training input using the student neural network to generate an output for the training input; processing the student neural network output using a discriminative neural network to generate a discriminative score for the student neural network output, wherein the discriminative score characterizes a prediction for whether the network input was generated using: (i) the student neural network, or (ii) a brain emulation neural network; and adjusting current values of the student neural network parameters using gradients of an objective function that depends on the discriminative score for the student neural network output.

20 Claims, 18 Drawing Sheets

(51) Int. Cl.
  *G06K 9/62* (2022.01)
  *G06N 3/04* (2006.01)
  *G06N 3/086* (2023.01)
  *G06N 3/084* (2023.01)

(52) U.S. Cl.
  CPC ........... *G06N 3/0454* (2013.01); *G06N 3/084* (2013.01); *G06N 20/20* (2019.01)

(56) References Cited

U.S. PATENT DOCUMENTS

| | | |
|---|---|---|
| 6,542,249 B1 | 4/2003 | Kofnnan et al. |
| 8,520,933 B2 | 8/2013 | Wang et al. |
| 8,775,341 B1 | 7/2014 | Commons |
| 9,015,093 B1 | 4/2015 | Commons |
| 9,646,243 B1 | 5/2017 | Goknnen |
| 9,753,959 B2 | 9/2017 | Birdwell et al. |
| 10,198,691 B2 | 2/2019 | Nino et al. |
| 10,248,675 B2 | 4/2019 | Birdwell et al. |
| 10,395,165 B2 | 8/2019 | Henry et al. |
| 10,713,562 B2 | 7/2020 | Kim et al. |
| 11,138,495 B2 | 10/2021 | Appuswanny et al. |
| 11,205,125 B2 | 12/2021 | Datta et al. |
| 2006/0036559 A1 | 2/2006 | Nugent |
| 2010/0284585 A1 | 11/2010 | Wang et al. |
| 2012/0005141 A1 | 1/2012 | Sasagawa |
| 2015/0106306 A1 | 4/2015 | Birdwell et al. |
| 2015/0106310 A1 | 4/2015 | Birdwell et al. |
| 2015/0106316 A1 | 4/2015 | Birdwell et al. |
| 2015/0170028 A1 | 6/2015 | Gupta et al. |
| 2016/0196488 A1 | 7/2016 | Ahn |
| 2016/0284082 A1 | 9/2016 | Varkuti |
| 2017/0372195 A1 | 12/2017 | Chiang et al. |
| 2018/0018358 A1 | 1/2018 | Birdwell et al. |
| 2018/0039880 A1 | 2/2018 | Tsutsui et al. |
| 2018/0075338 A1 | 3/2018 | Goknnen |
| 2018/0174053 A1 | 6/2018 | Lin |
| 2018/0322384 A1 | 11/2018 | Augustine et al. |
| 2019/0005384 A1 | 1/2019 | Sundar et al. |
| 2019/0130266 A1* | 5/2019 | Cao ..................... G06N 7/005 |
| 2019/0370659 A1 | 12/2019 | Dean et al. |
| 2020/0129110 A1 | 4/2020 | Mountford et al. |
| 2020/0151289 A1 | 5/2020 | Sikka et al. |
| 2020/0257961 A1 | 8/2020 | Hua et al. |
| 2020/0265303 A1 | 8/2020 | Osogami |
| 2020/0285944 A1 | 9/2020 | Lee et al. |
| 2020/0293899 A1 | 9/2020 | Fernando et al. |
| 2020/0320399 A1 | 10/2020 | Huang et al. |
| 2020/0364567 A1 | 11/2020 | Oh et al. |
| 2020/0401899 A1 | 12/2020 | Dohan et al. |
| 2021/0019599 A1 | 1/2021 | Mazzawi et al. |
| 2021/0020113 A1 | 1/2021 | Park et al. |
| 2021/0034813 A1 | 2/2021 | Wu et al. |
| 2021/0042602 A1 | 2/2021 | Zhao |
| 2021/0056378 A1 | 2/2021 | Yang et al. |
| 2021/0110272 A1 | 4/2021 | Guo et al. |
| 2021/0201107 A1 | 7/2021 | Laszlo et al. |
| 2021/0201111 A1 | 7/2021 | Laszlo et al. |
| 2021/0201115 A1 | 7/2021 | Laszlo et al. |
| 2021/0201119 A1 | 7/2021 | Laszlo et al. |
| 2021/0321963 A1 | 10/2021 | Manor et al. |
| 2022/0036151 A1 | 2/2022 | Chiang et al. |
| 2022/0050995 A1 | 2/2022 | Laszlo |
| 2022/0051079 A1 | 2/2022 | Laszlo |
| 2022/0092416 A1 | 3/2022 | Houlsby et al. |

OTHER PUBLICATIONS

PCT International Search Report and Written Opinion in International Appln. No. PCT/US2020/066147, dated May 3, 2021, 18 pages.
Ikeno et al., "Development of a Scheme and Tools to Construct a Standard Moth Brain for Neural Network Simulations," Computational Intelligence and Neuroscience, Jan. 2012, 2012:1-10.
PCT International Search Report and Written Opinion in International Appln. No. PCT/US2020/065936, dated Apr. 26, 2021, 18 pages.
PCT International Search Report and Written Opinion in International Appln. No. PCT/US2020/065948, dated May 3, 2021, 18 pages.
PCT International Search Report and Written Opinion in International Appln. No. PCT/US20/66153, dated Mar. 24, 2021, 8 pages.
Anonymous, "Aligning artificial neural networks to the brain yields shallow recurrent architectures," ICLR 2019, 19 pages.
Bashivan et al, "Neural population control via Deep Image Synthesis," bioRxiv, Nov. 4, 2018, 33 pages.
Desikan et al., "An automated labeling system for subdividing the human cerebral cortex on MRI scans into gyral based regions of interest." Neuroimage 31.3, Jul. 1, 2006, 13 pages.
Feldt et al, "Dissecting functional connectivity of neuronal microcircuits: experimental and theoretical insights," HAL archives-ouvertes, Aug. 27, 2018, 13 pages.
Fischl, "FreeSurfer," Neuroimage 62.2, Aug. 15, 2012, 8 pages.
Golovin et al, "Google vizier: A service for black-box optimization," In Proceedings of the 23rd ACM SIGKDD International Conference on Knowledge Discovery and Data Mining, 2017, 10 pages.
Goodfellow et al, "Generative adversarial nets," University of Montreal, NIPS 2014, 9 pages.
He et al., "Small-world anatomical networks in the human brain revealed by cortical thickness from MRI," Cerebral cortex 17.10, Jan. 4, 2007, 13 pages.
Hinaut et al, Real-time parallel processing of grammatical structure in the fronto-striatal system: a recurrent network simulation study using reservoir computing, PLoS ONE, Feb. 1, 2013, 18 pages.
Ho et al, "Generative adversarial imitation learning," 30th Conference on NIPS, 2016, 9 pages.
Huettel et al., "Functional magnetic resonance imaging." vol. 1. Sunderland: Sinauer Associates, Apr. 1, 2004, 8 pages.
Kell et al, "A task-optimized neural network replicates human auditory behavior, predicts brain responses, and reveals a cortical processing hierarchy," CellPress, May 2, 2018, 50 pages.
Kepner et al., "Graph algorithms in the language of linear algebra." Society for Industrial and Applied Mathematics, Jan. 1, 2011, 58 pages.
Kriegeskorte et al, "Deep neural networks: a new framework for modeling biological vision and brain information processing," bioRxiv, 2015, 22 pages.
Krizhevsky et al, "ImageNet Classification with Deep Convolutional Neural Networks", Advances in Neural Information Processing Systems, 2012.
Li et al, "Automated Reconstruction of a Serial-Section EM *Drosophila* Brain with Flood-Filling Networks and Local Realignment," bioRxiv: The Preparing Server for Biology, Aug. 4, 2019, 33 pages.
Rees et al, "Graph Theoretic and Motif Analyses of the Hippocampal Neuron Type Potential Connectome," eNeuro, Nov. 2016, 21 pages.
Roncal et al, "An automated images-to-graphs framework for high resolution connectomics," Frontiers in Neuroinformatics, Aug. 13, 2015, 10 pages.
Rubinov et al., "Complex network measures of brain connectivity: uses and interpretations." Neuroimage 52.3, Sep. 1, 2010, 11 pages.
Sandberg et al, "Whole Brain Emulation: A roadmap", Future of Humanity Institute, Oxford University, 2008, 130 pages.
Schrimpf et al, "Brain-Score: which artificial neural network for object recognition is most brain like," bioRxiv, Sep. 4, 2018, 9 pages.
Seguin et al, "Inferring neural signaling directionality from undirected structure connectomes," Nature Communications, 2019, 13 pages.
Serruya, "Connecting the brain to itself through an emulation," Frontiers in Neuroscience, Jun. 20, 2017, 16 pages.
Srivastava et al, "Dropout: a simple way to prevent neural networks from overfitting," Journal of Machine Learning Research, 2014, 30 pages.
Stanley et al, "Designing neural networks through neuroevolution," Nature Machine Intelligence, Jan. 2019, 12 pages.

(56) References Cited

OTHER PUBLICATIONS

Tanaka et al, Recent advances in physical reservoir computing: A Review, arXiv, Apr. 15, 2019, 64 pages.

Teplan, "Fundamentals of EEG measurement." Measurement science review 2.2, 2002, 11 pages.

Tzourio-Mazoyer et al., "Automated anatomical labeling of activations in SPM using a macroscopic anatomical parcellation of the MNI MRI single-subject brain." Neuroimage 15.1, Jan. 1, 2002, 17 pages.

Walker et al., "Introduction to PET imaging with emphasis on biomedical research." Neurotoxicology 25.4, Jun. 1, 2004, 10 pages.

Wang et al., "Parcellation-dependent small-world brain functional networks: a resting-state fMRI study." Human brain mapping 30.5, May 30, 2009, 13 pages.

Xie et al, "Exploring randomly wired neural networks for image recognition," arXix, Apr. 8, 2019, 10 pages.

Ying et al, "NAS-Bench-101: Towards reproducible neural architecture search," arXiv, May 14, 2019, 15 pages.

Zheng et al, "A complete electron microscopy volume of the brain of adult *Drosophila melanogaster*," Cell, Jul. 26, 2018, 37 pages.

Litwin-Kumar et al., "Constraining computational models using electron microscopy wiring diagrams," Current Opinion in Neurobiology, Oct. 2019, 58:94-100.

Peng et al., "SpikeCD: a parameter-insensitive spiking neural network with clustering degeneracy strategy," Neural Computing and Applications, Jan. 2018, 31(8):3933-3945.

International Preliminary Report on Patentability in International Appln. No. PCT/US2020/066147, dated Jul. 14, 2022, 11 pages.

International Preliminary Report on Patentability in International Appln. No. PCT/US2020/065936, dated Jul. 14, 2022, 11 pages.

International Preliminary Report on Patentability in International Appln. No. PCT/US2020/065943, dated Jul. 14, 2022, 11 pages.

International Preliminary Report on Patentability in International Appln. No. PCT/US2020/065948, dated Jul. 14, 2022, 11 pages.

International Preliminary Report on Patentability in International Appln. No. PCT/US2020/066153, dated Jul. 14, 2022, 6 pages.

\* cited by examiner

US 11,625,611 B2

TRAINING ARTIFICIAL NEURAL NETWORKS BASED ON SYNAPTIC CONNECTIVITY GRAPHS

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of computational units to generate an output for a received input. For example, a deep neural network is a deep machine learning model that includes an output layer and one or more hidden layers that each apply a non-linear transformation to a received input to generate an output.

SUMMARY

This specification describes systems implemented as computer programs on one or more computers in one or more locations for processing a synaptic resolution image of the brain of a biological organism to generate a synaptic connectivity graph, and implementing an artificial neural network having an architecture specified by the synaptic connectivity graph. A synaptic connectivity graph refers to a graph representing the structure of synaptic connections between neurons in the brain of a biological organism, e.g., a fly.

For convenience, throughout this specification, a neural network having an architecture specified by a synaptic connectivity graph may be referred to as a "brain emulation" neural network. Identifying an artificial neural network as a "brain emulation" neural network is intended only to conveniently distinguish such neural networks from other neural networks (e.g., with hand-engineered architectures), and should not be interpreted as limiting the nature of the operations that may be performed by the neural network or otherwise implicitly characterizing the neural network.

According to a first aspect there is provided a method performed by one or more data processing apparatus for training a student neural network having a set of student neural network parameters. The method includes repeatedly performing operations comprising processing a training input using the student neural network to generate an output for the training input. The student neural network output is processed using a discriminative neural network to generate a discriminative score for the student neural network output. The discriminative neural network is trained to process a network input to generate a discriminative score that characterizes a prediction for whether the network input was generated using: (i) the student neural network, or (ii) a brain emulation neural network having a set of brain emulation neural network parameters. The brain emulation neural network has a neural network architecture that is specified by a graph representing synaptic connectivity between neurons in a brain of a biological organism. The graph includes a set of nodes and edges, where each edge connects a pair of nodes, each node corresponds to a respective neuron in the brain of the biological organism, and each edge connecting a pair of nodes in the graph corresponds to a synaptic connection between a pair of neurons in the brain of the biological organism. The current values of the student neural network parameters are adjusted using gradients of an objective function that depends on the discriminative score for the student neural network output.

In some implementations, the student neural network is configured to process an input that includes image data, video data, audio data, odor data, point cloud data, magnetic field data, or a combination thereof, to generate an output that includes an embedding of the input.

In some implementations, the neural network architecture of the student neural network is less complex than the neural network architecture of the brain emulation neural network.

In some implementations, adjusting the current values of the student neural network parameters using gradients of an objective function that depends on the discriminative score for the student neural network output encourages the student neural network to generate outputs that are more likely to be misclassified by the discriminative neural network as having been generated by the brain emulation neural network.

In some implementations, specifying the neural network architecture of the brain emulation neural network by the graph representing synaptic connectivity between neurons in the brain of the biological organism includes mapping each node in the graph to a corresponding artificial neuron in the neural network architecture of the brain emulation neural network. Each edge in the graph is mapped to a connection between a pair of artificial neurons in the neural network architecture of the brain emulation neural network that correspond to the pair of nodes in the graph that are connected by the edge.

In some implementations, the graph representing synaptic connectivity between neurons in the brain of the biological organism is generated by processing a synaptic resolution image of at least a portion of the brain of the biological organism to identify: (i) a set of neurons in the brain, and (ii) a set of synaptic connections between pairs of neurons in the brain.

In some implementations, the synaptic resolution image of the brain of the biological organism is generated using electron microscopy techniques.

In some implementations, the graph represents synaptic connectivity between neurons in the brain of the biological organism that are predicted to have a particular function in the brain of the biological organism.

In some implementations, the particular function is a visual data processing function, an audio data processing function, or an odor data processing function.

In some implementations, values of the set of brain emulation neural network parameters are determined randomly prior to training of the student neural network and are not adjusted during the training of the student neural network.

In some implementations, the biological organism is an animal, e.g., a fly.

According to a second aspect there is provided a method performed by one or more data processing apparatus for training a student neural network having a set of student neural network parameters. The method comprises repeatedly performing operations including processing a training input using the student neural network to generate a student neural network output including a respective score for each of multiple classes. The training input is processed using a brain emulation neural network having a set of brain emulation neural network parameters to generate a brain emulation neural network output including a respective score for each of the classes. The brain emulation neural network has a neural network architecture that is specified by a graph representing synaptic connectivity between neurons in a brain of a biological organism. The graph includes a set of nodes and edges, where each edge connects a pair of nodes, each node corresponds to a respective neuron in the brain of the biological organism, and each edge connecting a pair of nodes in the graph corresponds to a synaptic connection between a pair of neurons in the brain of the biological organism. The current values of the student neural network parameters are adjusted using gradients of an objective function that characterizes a similarity between: (i) the student neural network output for the training input, and (ii) the brain emulation neural network output for the training input.

In some implementations, adjusting the current values of the student neural network parameters using gradients of the objective function encourages the student neural network to generate student neural network outputs that match brain emulation neural network outputs generated by the brain emulation neural network.

In some implementations, the student neural network is configured to process an input including image data, video data, audio data, odor data, point cloud data, magnetic field data, or a combination thereof.

In some implementations, the neural network architecture of the student neural network is less complex than the neural network architecture of the brain emulation neural network.

In some implementations, specifying the neural network architecture of the brain emulation neural network by the graph representing synaptic connectivity between neurons in the brain of the biological organism includes mapping each node in the graph to a corresponding artificial neuron in the neural network architecture of the brain emulation neural network. Each edge in the graph is mapped to a connection between a pair of artificial neurons in the neural network architecture of the brain emulation neural network that correspond to the pair of nodes in the graph that are connected by the edge.

In some implementations, the graph representing synaptic connectivity between neurons in the brain of the biological organism is generated by processing a synaptic resolution image of at least a portion of the brain of the biological organism to identify: (i) a set of neurons in the brain, and (ii) a set of synaptic connections between pairs of neurons in the brain.

In some implementations, the synaptic resolution image of the brain of the biological organism is generated using electron microscopy techniques.

In some implementations, the graph represents synaptic connectivity between neurons in the brain of the biological organism that are predicted to have a particular function in the brain of the biological organism.

In some implementations, the particular function is a visual data processing function, an audio data processing function, or an odor data processing function.

In some implementations, the values of the set of brain emulation neural network parameters are trained on a set of training data using machine learning training techniques prior to training of the student neural network.

According to a third aspect, there is provided a method performed by one or more data processing apparatus, the method including obtaining a synaptic resolution image of at least a portion of a brain of a biological organism. The image is processed to identify: (i) a set of neurons in the brain, and (ii) a set of synaptic connections between pairs of neurons in the brain. Data defining a graph representing synaptic connectivity between the neurons in the brain is generated, where the graph includes a set of nodes and edges, where each edge connects a pair of nodes. Each neuron in the brain is identified as a respective node in the graph. Each synaptic connection between a pair of neurons in the brain is identified as an edge between a corresponding pair of nodes in the graph. An artificial neural network architecture is determined that corresponds to the graph representing the synaptic connectivity between the neurons in the brain. A network input is processed using an artificial neural network having the artificial neural network architecture to generate a network output.

In some implementations, determining an artificial neural network architecture corresponding to the graph representing the synaptic connectivity between the neurons in the brain includes mapping each node in the graph to a corresponding artificial neuron in the artificial neural network architecture. Each edge in the graph is mapped to a connection between a pair of artificial neurons in the artificial neural network architecture that correspond to the pair of nodes in the graph that are connected by the edge.

In some implementations, the method further includes processing the image to identify a respective direction of each of the synaptic connections between pairs of neurons in the brain. Generating data defining the graph further includes determining a direction of each edge in the graph based on the direction of the synaptic connection corresponding to the edge. Each connection between a pair of artificial neurons in the artificial neural network architecture has a direction specified by the direction of the corresponding edge in the graph.

In some implementations, the method further includes processing the image to determine a respective weight value for each of the synaptic connections between pairs of neurons in the brain. Generating data defining the graph further includes determining a weight value for each edge in the graph based on the weight value for the synaptic connection corresponding to the edge. Each connection between a pair of artificial neurons in the artificial neural network architecture has a weight value specified by the weight value of the corresponding edge in the graph.

In some implementations, processing a network input using an artificial neural network having the artificial neural network architecture to generate a network output includes, for each of multiple given artificial neurons of the artificial neural network, receiving artificial neuron inputs from other artificial neurons in the artificial neural network that are connected to the given artificial neuron by connections directed towards the given artificial neuron. An artificial neuron output is generated based on the artificial neuron inputs. The artificial neuron output is provided to other artificial neurons in the artificial neural network that are connected to the given artificial neuron by connections directed away from the given artificial neuron.

In some implementations, the method further includes training the artificial neural network having the artificial neural network architecture using machine learning training techniques on a set of training data.

In some implementations, the network input includes image data.

In some implementations, the network output includes classification data that specifies a respective score for each of multiple classes.

In some implementations, the synaptic resolution image of the brain of the biological organism is generated using electron microscopy techniques.

In some implementations, processing the image to identify: (i) a set of neurons in the brain, and (ii) a set of synaptic connections between pairs of neurons in the brain, includes: identifying positions of the neurons in the image; and identifying the synaptic connections between pairs of neurons based on proximity of the positions of the neurons in the image.

In some implementations, identifying positions of neurons in the image includes processing the image, features derived from the image, or both, using a machine learning model that is trained using supervised learning techniques to identify positions of neurons in images.

In some implementations, identifying the synaptic connections between pairs of neurons based on proximity of the positions of the neurons in the image includes, for one or more pairs of neurons including a first neuron and a second neuron: determining: (i) a first tolerance region in the image around the first neuron, and (ii) a second tolerance region in the image around the second neuron; and determining that the first neuron is connected by a synapse to the second neuron based on an overlap between the first tolerance region and the second tolerance region.

In some implementations, processing the image to determine a respective weight value for each of the synaptic connections between pairs of neurons in the brain includes, for a synaptic connection between a first neuron and a second neuron in the brain, determining the weight value for the synaptic connection between the first neuron and the second neuron based on a proximity of the first neuron and the second neuron in the image.

According to a fourth aspect, there is provided a method performed by one or more data processing apparatus, the method including obtaining data defining a graph representing synaptic connectivity between neurons in a brain of a biological organism. The graph includes a set of nodes and edges, where each edge connects a pair of nodes, each node corresponds to a respective neuron in the brain of the biological organism, and each edge connecting a pair of nodes in the graph corresponds to a synaptic connection between a pair of neurons in the brain of the biological organism. The method includes determining, for each node in the graph, a respective set of one or more node features characterizing a structure of the graph relative to the node. The method includes identifying a sub-graph of the graph, including selecting a proper subset of the nodes in the graph for inclusion in the sub-graph based on the node features of the nodes in the graph. The method includes determining an artificial neural network architecture corresponding to the sub-graph of the graph.

In some implementations, for each node in the graph, the set of node features characterizing the structure of the graph relative to the node includes one or more of: a node degree feature specifying a number of other nodes that are connected to the node by an edge; a path length feature specifying a length of a longest path in the graph starting from the node; or a neighborhood size feature specifying a number of other nodes that are connected to the node by a path in the graph having a length that is less than or equal to a threshold value.

In some implementations, obtaining data defining the graph representing synaptic connectivity between neurons in the brain of the biological organism includes obtaining data defining a weight value for each edge in the graph, where the weight value for each edge in the graph characterizes the corresponding synaptic connection in the brain of the biological organism.

In some implementations, for each node in the graph, the set of node features characterizing the structure of the graph relative to the node are determined based at least in part on the weight values of edges connecting the node to other nodes in the graph.

In some implementations, the proper subset of the nodes in the graph selected for inclusion in the sub-graph are predicted to correspond to neurons having a particular function in the brain of the biological organism.

In some implementations, the particular function is a visual data processing function, and the method further includes providing an artificial neural network having the artificial neural network architecture corresponding to the sub-graph of the graph for performing an image processing task.

In some implementations, the particular function is an audio data processing function, and the method further includes providing an artificial neural network having the artificial neural network architecture corresponding to the sub-graph of the graph for performing an audio data processing task.

In some implementations, the particular function is an odor data processing function, and the method further includes providing an artificial neural network having the artificial neural network architecture corresponding to the sub-graph of the graph for performing an odor data processing function.

In some implementations, the method further includes obtaining a representation of the sub-graph as a two-dimensional array of numerical values, where a value of a component of the array at position (i,j) indicates if the sub-graph includes an edge from node i to node j. The array is processed to identify a set of clusters in the array, where each cluster specifies a contiguous region of the array. Edges from the sub-graph that are not included in the identified clusters are removed prior to determining the artificial neural network architecture corresponding to the sub-graph.

In some implementations, processing the array to identify the set of clusters in the array includes processing the array using a blob detection algorithm.

In some implementations, determining an artificial neural network architecture corresponding to the sub-graph of the graph includes mapping each node in the sub-graph to a corresponding artificial neuron in the artificial neural network architecture. Each edge in the sub-graph is mapped to a connection between a pair of artificial neurons in the artificial neural network architecture that correspond to the pair of nodes in the sub-graph that are connected by the edge.

In some implementations, obtaining data defining a graph representing synaptic connectivity between neurons in a brain of a biological organism includes: obtaining a synaptic resolution image of at least a portion of the brain of the biological organism; and processing the image to identify: (i) a set of neurons in the brain, and (ii) a set of synaptic connections between pairs of neurons in the brain.

According to a fifth aspect, there is provided a system including one or more computers and one or more storage devices storing instructions that when executed by the one or more computers cause the one or more computers to implement a reservoir computing neural network. The reservoir computing neural network is configured to receive a network input and to generate a network output from the network output, and comprises: (i) a brain emulation sub-network, and (ii) a prediction sub-network. The brain emulation sub-network is configured to process the network input in accordance with values of a set of brain emulation sub-network parameters to generate an alternative representation of the network input. The prediction sub-network is configured to process the alternative representation of the network input in accordance with values of a set of prediction sub-network parameters to generate the network output. The values of the brain emulation sub-network parameters are determined before the reservoir computing neural network is trained and are not adjusting during training of the reservoir computing neural network. The values of the prediction sub-network parameters are adjusted during training of the reservoir computing neural network. The brain emulation sub-network has a neural network architecture that is specified by a graph representing synaptic connectivity between neurons in a brain of a biological organism. The graph includes a set of nodes and edges, where each edge connects a pair of nodes, each node corresponds to a respective neuron in the brain of the biological organism, and each edge connecting a pair of nodes in the graph corresponds to a synaptic connection between a pair of neurons in the brain of the biological organism.

In some implementations, specifying the neural network architecture of the brain emulation sub-network by the graph representing synaptic connectivity between neurons in the brain of the biological organism includes mapping each node in the graph to a corresponding artificial neuron in the neural network architecture of the brain emulation sub-network. Each edge in the graph is mapped to a connection between a pair of artificial neurons in the neural network architecture of the brain emulation sub-network that correspond to the pair of nodes in the graph that are connected by the edge.

In some implementations, the graph representing synaptic connectivity between neurons in the brain of the biological organism is generated by processing a synaptic resolution image of at least a portion of the brain of the biological organism to identify: (i) a set of neurons in the brain, and (ii) a set of synaptic connections between pairs of neurons in the brain.

In some implementations, the synaptic resolution image of the brain of the biological organism is generated using electron microscopy techniques.

In some implementations, the graph represents synaptic connectivity between neurons in the brain of the biological organism that are predicted to have a particular function in the brain of the biological organism.

In some implementations, the particular function is a visual data processing function, an audio data processing function, or an odor data processing function.

In some implementations, the values of the prediction sub-network parameters are adjusted during training of the reservoir computing neural network to optimize an objective function.

In some implementations, the objective function includes a term characterizing a prediction accuracy of the reservoir computing neural network.

In some implementations, the term characterizing the prediction accuracy of the reservoir computing neural network includes a cross-entropy loss term.

In some implementations, the objective function includes a term characterizing a magnitude of the values of the prediction sub-network parameters.

In some implementations, dropout regularization is applied to the brain emulation sub-network parameters during training of the reservoir computing neural network.

In some implementations, the reservoir computing neural network is configured to process a network input including image data, video data, audio data, odor data, point cloud data, magnetic field data, or a combination thereof.

In some implementations, the reservoir computing neural network is configured to generate a classification output that includes a respective score for each of a plurality of classes.

In some implementations, the neural network architecture of the prediction sub-network is less complex than the neural network architecture of the brain emulation sub-network.

In some implementations, the prediction sub-network includes only a single neural network layer.

In some implementations, the values of the brain emulation sub-network parameters are determined based on weight values associated with synaptic connections between neurons in the brain of the biological organism.

According to a sixth aspect there is provided a method performed by one or more data processing apparatus, the method including obtaining data defining a synaptic connectivity graph representing synaptic connectivity between neurons in a brain of a biological organism. The synaptic connectivity graph includes a set of nodes and edges, where each edge connects a pair of nodes, each node corresponds to a respective neuron in the brain of the biological organism, and each edge connecting a pair of nodes in the synaptic connectivity graph corresponds to a synaptic connection between a pair of neurons in the brain of the biological organism. Data defining a set of candidate graphs is generated based on the synaptic connectivity graph. For each candidate graph, a performance measure on a machine learning task of a neural network having a neural network architecture that is specified by the candidate graph is determined. A final neural network architecture is selected for performing the machine learning task based on the performance measures.

In some implementations, obtaining data defining the synaptic connectivity graph representing synaptic connectivity between neurons in the brain of the biological organism includes: obtaining a synaptic resolution image of at least a portion of the brain of the biological organism; and processing the image to identify: (i) a set of neurons in the brain, and (ii) a set of synaptic connections between pairs of neurons in the brain.

In some implementations, the synaptic resolution image of the brain of the biological organism is generated using electron microscopy techniques.

In some implementations, generating data defining the set of candidate graphs based on the synaptic connectivity graph includes, for each of multiple graph features: determining a value of the graph feature for the synaptic connectivity graph; and determining a constraint corresponding to the graph feature based on the value of the graph feature for the synaptic connectivity graph. The constraint corresponding to the graph feature specifies a target value or a range of target values of the graph feature for the candidate graphs. The set of candidate graphs are generated based on the constraints corresponding to the graph features.

In some implementations, the set of graph features includes one or more of: (i) a graph feature that specifies a number of nodes in a graph, (ii) a graph feature that specifies a number of edges in a largest cluster in a two-dimensional array representing a graph, (iii) a graph feature that specifies a number of clusters in a two-dimensional array representing a graph that include a number of edges that is within a predefined range of values, (iv) an average path length between nodes in a graph, or (v) a maximum path length between nodes in a graph.

In some implementations, generating a candidate graph based on the constraints corresponding to the graph features includes: initializing the candidate graph; and at each of one or more iterations, updating the candidate graph to cause the candidate graph to satisfy a corresponding constraint.

In some implementations, initializing the candidate graph includes randomly initializing the candidate graph.

In some implementations, generating data defining the set of candidate graphs based on the synaptic connectivity graph includes generating a set of current graphs based on the synaptic connectivity graph. Each current graph is generated by applying one or more random modifications to the synaptic connectivity graph. The set of current graphs is updated at each of multiple iterations, including, at each iteration: randomly sampling a plurality of current graphs from the set of current graphs; determining, for each sampled graph, a performance measure on the machine learning task of a neural network having a neural network architecture that is specified by the sampled graph; and updating the set of current graphs based on the performance measures of the sampled graphs. After a final iteration of the plurality of iterations, each current graph in the set of current graphs is identified as a candidate graph.

In some implementations, updating the set of current graphs based on the performance measures of the sampled graphs includes removing any sampled graph having a performance measure that does not satisfy a threshold from the set of current graphs.

In some implementations, updating the set of current graphs based on the performance measures of the sampled graphs includes: identifying one or more of the sampled graphs having the highest performance measures; generating one or more new graphs based on the randomly sampled graphs, where each new graph is generated by applying one or more random modifications to a sampled graph; and adding the new graphs to the set of current graphs.

In some implementations, determining a performance measure on a machine learning task of a neural network having a neural network architecture that is specified by a candidate graph includes determining the neural network architecture that is specified by the candidate graph, including mapping each node in the candidate graph to a corresponding artificial neuron in the neural network architecture. Each edge in the candidate graph is mapped to a connection between a pair of artificial neurons in the neural network architecture that correspond to the pair of nodes in the candidate graph that are connected by the edge.

In some implementations, selecting a final neural network architecture for performing the machine learning task based on the performance measures includes selecting the neural network architecture specified by the candidate graph associated with the highest performance measure.

In some implementations, the machine learning task includes processing image data to generate a classification of the image data.

In some implementations, the machine learning task includes processing audio data to generate a classification of the audio data.

In some implementations, generating data defining the set of candidate graphs based on the synaptic connectivity graph includes, at each of multiple iterations, generating a candidate graph by applying one or more transformation operations to the synaptic connectivity graph, where the transformation operations are specified by current values of transformation operation parameters. A performance measure on the machine learning task of a neural network having a neural network architecture that is specified by the candidate graph is determined. The current values of the transformation operation parameters are updated based at least in part on the performance measure.

According to a seventh aspect, there is provided a system including: one or more computers; and one or more storage devices communicatively coupled to the one or more computers, where the one or more storage devices store instructions that, when executed by the one or more computers, cause the one or more computers to perform the operations of the method of any preceding aspect.

According to an eighth aspect, there are provided one or more non-transitory computer storage media storing instructions that when executed by one or more computers cause the one or more computers to perform the operations of the method of any preceding aspect.

Particular embodiments of the subject matter described in this specification can be implemented so as to realize one or more of the following advantages.

The systems described in this specification can implement a brain emulation neural network having an architecture specified by a synaptic connectivity graph derived from a synaptic resolution image of the brain of a biological organism. The brains of biological organisms may be adapted by evolutionary pressures to be effective at solving certain tasks, e.g., classifying objects or generating robust object representations, and brain emulation neural networks may share this capacity to effectively solve tasks. In particular, compared to other neural networks, e.g., with manually specified neural network architectures, brain emulation neural networks may require less training data, fewer training iterations, or both, to effectively solve certain tasks. Moreover, brain emulation neural networks may perform certain machine learning tasks more effectively, e.g., with higher accuracy, than other neural networks.

The systems described in this specification can process a synaptic connectivity graph corresponding to a brain to predict the neuronal types (e.g., primary sensory type, visual type, olfactory type, memory type, and the like) of neurons in the brain. In particular, features can be computed for each node in the graph (e.g., the path length corresponding to the node and the number of edges connected to the node), and the node features can be used to classify certain nodes as corresponding to a type of neuron in the brain. A sub-graph of the overall graph corresponding to neurons that are predicted to be of a certain type can be identified, and a brain emulation neural network may be implemented with an architecture specified by the sub-graph, i.e., rather than the entire graph. Implementing a brain emulation neural network with an architecture specified by a sub-graph corresponding to neurons of a certain type may enable the brain emulation neural network to perform certain tasks more effectively while consuming fewer computational resources (e.g. memory and computing power). In one example, the brain emulation neural network may be configured to perform image processing tasks, and the architecture of the brain emulation neural network may be specified by a sub-graph corresponding to only the visual system of the brain (i.e., to visual type neurons).

The systems described in this specification can use a brain emulation neural network to train another neural network, referred to as a "student" neural network, having a substantially less complex neural network architecture. More specifically, the student neural network may be trained to match outputs that are generated by the brain emulation neural network. The brains of many biological organisms have a large number of neurons, e.g., a fly brain may have on the order of ~$10^5$ neurons or more. Therefore, a brain emulation network may have a highly complex architecture, and processing data using a brain emulation neural network may be computationally expensive. After being trained, the student neural network may inherit the capacity of the brain emulation neural network to effectively solve certain tasks, while consuming fewer computational resources than the brain emulation neural network due to having a substantially less complex neural network architecture.

The systems described in this specification can use a brain emulation neural network in reservoir computing applications. In particular, a "reservoir computing" neural network may be implemented with an architecture specified by a brain emulation sub-network followed by a "prediction" sub-network. Generally, the prediction sub-network may have a substantially less complex architecture than the brain emulation neural network, e.g., the prediction sub-network may consist of a single classification layer. During training of the reservoir computing neural network, only the weights of the prediction sub-network are trained, while the weights of the brain emulation neural network are considered static and are not trained. Generally, a brain emulation neural network may have a very large number of trainable parameters and a highly recurrent architecture. Therefore training the brain emulation neural network may be computationally-intensive and prone to failure, e.g., as a result of the model parameter values of the brain emulation neural network oscillating rather than converging to fixed values. The reservoir computing neural network described in this specification may harness the capacity of the brain emulation neural network, e.g., to generate representations that are effective for solving tasks, without requiring the brain emulation neural network to be trained.

This specification further describes techniques for using the synaptic connectivity graph to "seed" (i.e., initialize) a search through a space of possible neural network architectures to identify an architecture that can be used to effectively perform a machine learning task. More specifically, the synaptic connectivity graph may be used to derive "candidate" graphs which specify corresponding neural network architectures, and the best performing of these architectures may be selected to perform the machine learning task. Seeding the neural architecture search process using the synaptic connectivity graph may facilitate the discovery of large numbers of biologically-inspired neural network architectures, some of which may be effective for performing machine learning tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
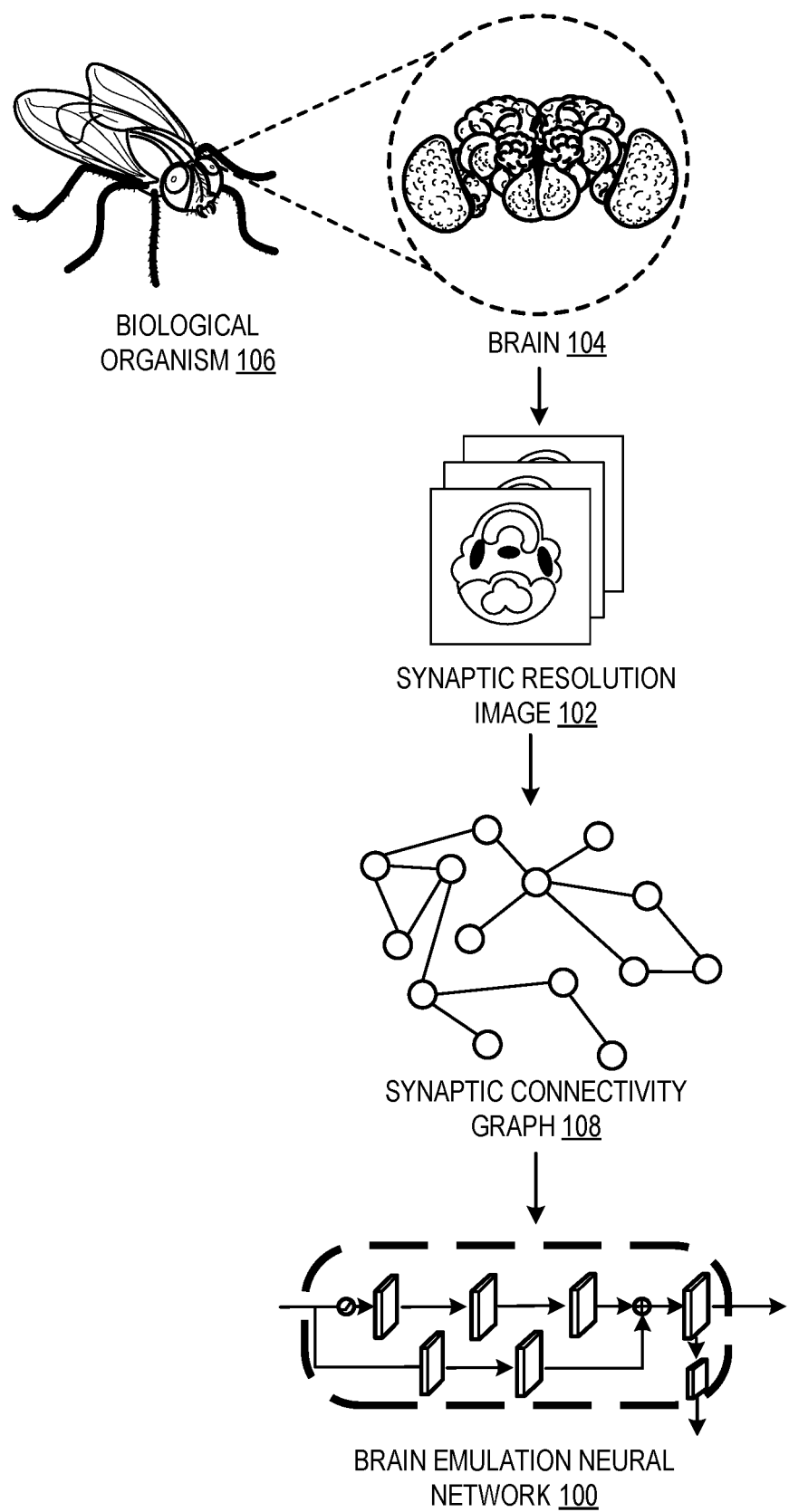
FIG. 1 illustrates an example of generating a brain emulation neural network based on a synaptic resolution image of the brain of a biological organism.

FIG. 1 illustrates an example of generating an artificial (i.e., computer implemented) brain emulation neural network 100 based on a synaptic resolution image 102 of the brain 104 of a biological organism 106, e.g., a fly. The synaptic resolution image 102 may be processed to generate a synaptic connectivity graph 108, e.g., where each node of the graph 108 corresponds to a neuron in the brain 104, and two nodes in the graph 108 are connected if the corresponding neurons in the brain 104 share a synaptic connection. The structure of the graph 108 may be used to specify the architecture of the brain emulation neural network 100. For example, each node of the graph 108 may mapped to an artificial neuron, a neural network layer, or a group of neural network layers in the brain emulation neural network 100. Further, each edge of the graph 108 may be mapped to a connection between artificial neurons, layers, or groups of layers in the brain emulation neural network 100. The brain 104 of the biological organism 106 may be adapted by evolutionary pressures to be effective at solving certain tasks, e.g., classifying objects or generating robust object representations, and the brain emulation neural network 100 may share this capacity to effectively solve tasks. These features and other features are described in more detail below.

Figure 2:
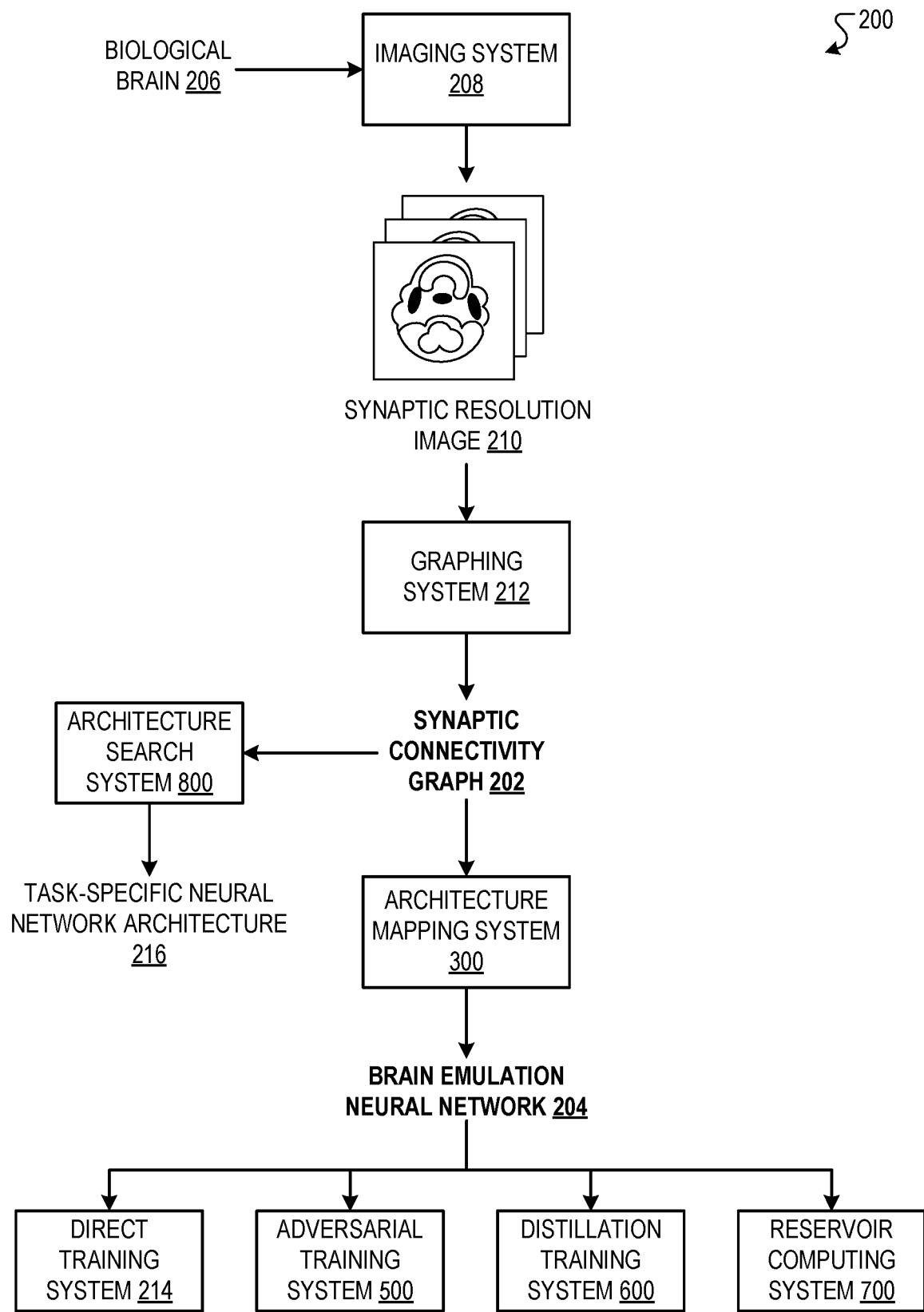
FIG. 2 shows an example data flow for generating a synaptic connectivity graph and a brain emulation neural network based on the brain of a biological organism.

FIG. 2 shows an example data flow 200 for generating a synaptic connectivity graph 202 and a brain emulation neural network 204 based on the brain 206 of a biological organism. As used throughout this document, a brain may refer to any amount of nervous tissue from a nervous system of a biological organism, and nervous tissue may refer to any tissue that includes neurons (i.e., nerve cells). The biological organism may be, e.g., a worm, a fly, a mouse, a cat, or a human.

An imaging system 208 may be used to generate a synaptic resolution image 210 of the brain 206. An image of the brain 206 may be referred to as having synaptic resolution if it has a spatial resolution that is sufficiently high to enable the identification of at least some synapses in the brain 206. Put another way, an image of the brain 206 may be referred to as having synaptic resolution if it depicts the brain 206 at a magnification level that is sufficiently high to enable the identification of at least some synapses in the brain 206. The image 210 may be a volumetric image, i.e., that characterizes a three-dimensional representation of the brain 206. The image 210 may be represented in any appropriate format, e.g., as a three-dimensional array of numerical values.

The imaging system 208 may be any appropriate system capable of generating synaptic resolution images, e.g., an electron microscopy system. The imaging system 208 may process "thin sections" from the brain 206 (i.e., thin slices of the brain attached to slides) to generate output images that each have a field of view corresponding to a proper subset of a thin section. The imaging system 208 may generate a complete image of each thin section by stitching together the images corresponding to different fields of view of the thin section using any appropriate image stitching technique. The imaging system 208 may generate the volumetric image 210 of the brain by registering and stacking the images of each thin section. Registering two images refers to applying transformation operations (e.g., translation or rotation operations) to one or both of the images to align them. Example techniques for generating a synaptic resolution image of a brain are described with reference to: Z. Zheng, et al., "A complete electron microscopy volume of the brain of adult *Drosophila melanogaster*," Cell 174, 730-743 (2018).

A graphing system 212 is configured to process the synaptic resolution image 210 to generate the synaptic connectivity graph 202. The synaptic connectivity graph 202 specifies a set of nodes and a set of edges, such that each edge connects two nodes. To generate the graph 202, the graphing system 212 identifies each neuron in the image 210 as a respective node in the graph, and identifies each synaptic connection between a pair of neurons in the image 210 as an edge between the corresponding pair of nodes in the graph.

The graphing system 212 may identify the neurons and the synapses depicted in the image 210 using any of a variety of techniques. For example, the graphing system 212 may process the image 210 to identify the positions of the neurons depicted in the image 210, and determine whether a synapse connects two neurons based on the proximity of the neurons (as will be described in more detail below). In this example, the graphing system 212 may process an input including: (i) the image, (ii) features derived from the image, or (iii) both, using a machine learning model that is trained using supervised learning techniques to identify neurons in images. The machine learning model may be, e.g., a convolutional neural network model or a random forest model. The output of the machine learning model may include a neuron probability map that specifies a respective probability that each voxel in the image is included in a neuron. The graphing system 212 may identify contiguous clusters of voxels in the neuron probability map as being neurons.

Optionally, prior to identifying the neurons from the neuron probability map, the graphing system 212 may apply one or more filtering operations to the neuron probability map, e.g., with a Gaussian filtering kernel. Filtering the neuron probability map may reduce the amount of "noise" in the neuron probability map, e.g., where only a single voxel in a region is associated with a high likelihood of being a neuron.

The machine learning model used by the graphing system 212 to generate the neuron probability map may be trained using supervised learning training techniques on a set of training data. The training data may include a set of training examples, where each training example specifies: (i) a training input that can be processed by the machine learning model, and (ii) a target output that should be generated by the machine learning model by processing the training input. For example, the training input may be a synaptic resolution image of a brain, and the target output may be a "label map" that specifies a label for each voxel of the image indicating whether the voxel is included in a neuron. The target outputs of the training examples may be generated by manual annotation, e.g., where a person manually specifies which voxels of a training input are included in neurons.

Example techniques for identifying the positions of neurons depicted in the image 210 using neural networks (in particular, flood-filling neural networks) are described with reference to: P. H. Li et al.: "Automated Reconstruction of a Serial-Section EM *Drosophila* Brain with Flood-Filling Networks and Local Realignment," bioRxiv doi:10.1101/605634 (2019).

The graphing system 212 may identify the synapses connecting the neurons in the image 210 based on the proximity of the neurons. For example, the graphing system 212 may determine that a first neuron is connected by a synapse to a second neuron based on the area of overlap between: (i) a tolerance region in the image around the first neuron, and (ii) a tolerance region in the image around the second neuron. That is, the graphing system 212 may determine whether the first neuron and the second neuron are connected based on the number of spatial locations (e.g., voxels) that are included in both: (i) the tolerance region around the first neuron, and (ii) the tolerance region around the second neuron. For example, the graphing system 212 may determine that two neurons are connected if the overlap between the tolerance regions around the respective neurons includes at least a predefined number of spatial locations (e.g., one spatial location). A "tolerance region" around a neuron refers to a contiguous region of the image that includes the neuron. For example, the tolerance region around a neuron may be specified as the set of spatial locations in the image that are either: (i) in the interior of the neuron, or (ii) within a predefined distance of the interior of the neuron.

The graphing system 212 may further identify a weight value associated with each edge in the graph 202. For example, the graphing system 212 may identify a weight for an edge connecting two nodes in the graph 202 based on the area of overlap between the tolerance regions around the respective neurons corresponding to the nodes in the image 210. The area of overlap may be measured, e.g., as the number of voxels in the image 210 that are contained in the overlap of the respective tolerance regions around the neurons. The weight for an edge connecting two nodes in the graph 202 may be understood as characterizing the (approximate) strength of the connection between the corresponding neurons in the brain (e.g., the amount of information flow through the synapse connecting the two neurons).

In addition to identifying synapses in the image 210, the graphing system 212 may further determine the direction of each synapse using any appropriate technique. The "direction" of a synapse between two neurons refers to the direction of information flow between the two neurons, e.g., if a first neuron uses a synapse to transmit signals to a second neuron, then the direction of the synapse would point from the first neuron to the second neuron. Example techniques for determining the directions of synapses connecting pairs of neurons are described with reference to: C. Seguin, A. Razi, and A. Zalesky: "Inferring neural signalling directionality from undirected structure connectomes," Nature Communications 10, 4289 (2019), doi:10.1038/s41467-019-12201-w.

In implementations where the graphing system 212 determines the directions of the synapses in the image 210, the graphing system 212 may associate each edge in the graph 202 with direction of the corresponding synapse. That is, the graph 202 may be a directed graph. In other implementations, the graph 202 may be an undirected graph, i.e., where the edges in the graph are not associated with a direction.

The graph 202 may be represented in any of a variety of ways. For example, the graph 202 may be represented as a two-dimensional array of numerical values with a number of rows and columns equal to the number of nodes in the graph. The component of the array at position (i,j) may have value 1 if the graph includes an edge pointing from node i to node j, and value 0 otherwise. In implementations where the graphing system 212 determines a weight value for each edge in the graph 202, the weight values may be similarly represented as a two-dimensional array of numerical values. More specifically, if the graph includes an edge connecting node i to node j, the component of the array at position (i,j) may have a value given by the corresponding edge weight, and otherwise the component of the array at position (i,j) may have value 0.

An architecture mapping system 300 may process the synaptic connectivity graph 202 to determine the architecture of the brain emulation neural network 204. For example, the architecture mapping system 300 may map each node in the graph 202 to: (i) an artificial neuron, (ii) a neural network layer, or (iii) a group of neural network layers, in the architecture of the brain emulation neural network 204. The architecture mapping system 300 may further map each edge of the graph 202 to a connection in the brain emulation neural network 204, e.g., such that a first artificial neuron that is connected to a second artificial neuron is configured to provide its output to the second artificial neuron. In some implementations, the architecture mapping system 300 may apply one or more transformation operations to the graph 202 before mapping the nodes and edges of the graph 202 to corresponding components in the architecture of the brain emulation neural network 204, as will be described in more detail below. An example architecture mapping system 300 is described in more detail with reference to FIG. 3.

The brain emulation neural network 204 may be provided to one or more of: the direct training system 214, the adversarial training system 500, the distillation training system 600, or the reservoir computing system 700, each of which will be described in more detail next.

The direct training system 214 is configured to train the brain emulation neural network 204 using machine learning training techniques on a set of training data. The training data may include multiple training examples, where each training example specifies: (i) a training input, and (ii) a corresponding target output that should be generated by the brain emulation neural network 204 by processing the training input. In one example, the direct training system 214 may train the brain emulation neural network 204 over multiple training iterations using a stochastic gradient descent optimization technique. In this example, at each training iteration, the direct training system 214 may sample a "batch" (set) of one or more training examples from the training data, and process the training inputs specified by the training examples to generate corresponding network outputs. The direct training system 214 may evaluate an objective function that measures a similarity between: (i) the target outputs specified by the training examples, and (ii) the network outputs generated by the brain emulation neural network, e.g., a cross-entropy or squared-error objective function. The direct training system 214 may determine gradients of the objective function, e.g., using backpropagation techniques, and update the parameter values of the brain emulation neural network 204 using the gradients, e.g., using any appropriate gradient descent optimization algorithm, e.g., RMSprop or Adam.

The adversarial training system 500 and the distillation training system 600 are configured to use the brain emulation neural network 204 to facilitate training of a "student" neural network having a less complex architecture than the brain emulation neural network 204. The complexity of a neural network architecture may be measured, e.g., by the number of parameters required to specify the operations performed by the neural network. The adversarial training system 500 and the distillation training system 600 may train the student neural network to match the outputs generated by the brain emulation neural network. After training, the student neural network may inherit the capacity of the brain emulation neural network to effectively solve certain tasks, while consuming fewer computational resources (e.g., memory and computing power) than the brain emulation neural network. An example adversarial training system 500 is described with reference to FIG. 5, and an example distillation training system 600 is described with reference to FIG. 6.

The reservoir computing system 700 uses the brain emulation neural network 204 as a sub-network of a "reservoir computing" neural network. The reservoir computing neural network is configured to process a network input using the brain emulation neural network 204 to generate an alternative representation of the network input, and process the alternative representation of the network input using a "prediction" sub-network to generate a network output. During training of the reservoir computing neural network, the parameter values of the prediction sub-network are trained, but the parameter values of the brain emulation neural network 204 are static, i.e., are not trained. Instead of being trained, the parameter values of the brain emulation neural network 204 may be determined from the weight values of the edges of the synaptic connectivity graph, as will be described in more detail below. The reservoir computing system 700 facilitates application of the brain emulation neural network to machine learning tasks by obviating the need to train the parameter values of the brain emulation neural network 204. An example reservoir computing system 700 is described in more detail with reference to FIG. 7.

The architecture search system 800 uses the synaptic connectivity graph 202 characterizing the biological brain 206 to seed (i.e., initialize) a search procedure to identify a neural network architecture 216 that is effective for solving a machine learning task. More specifically, the architecture search system 800 uses the synaptic connectivity graph 202 to generate a set of "candidate" graphs and determines an effectiveness of the neural network architecture specified by each candidate graph for performing the machine learning task. The architecture search system 800 may identify the candidate graph specifying the most effective neural network architecture, and thereafter provide a neural network having this task-specific neural network architecture 216 for performing the machine learning task. An example architecture search system 800 is described in more detail with reference to FIG. 8.

Figure 3:
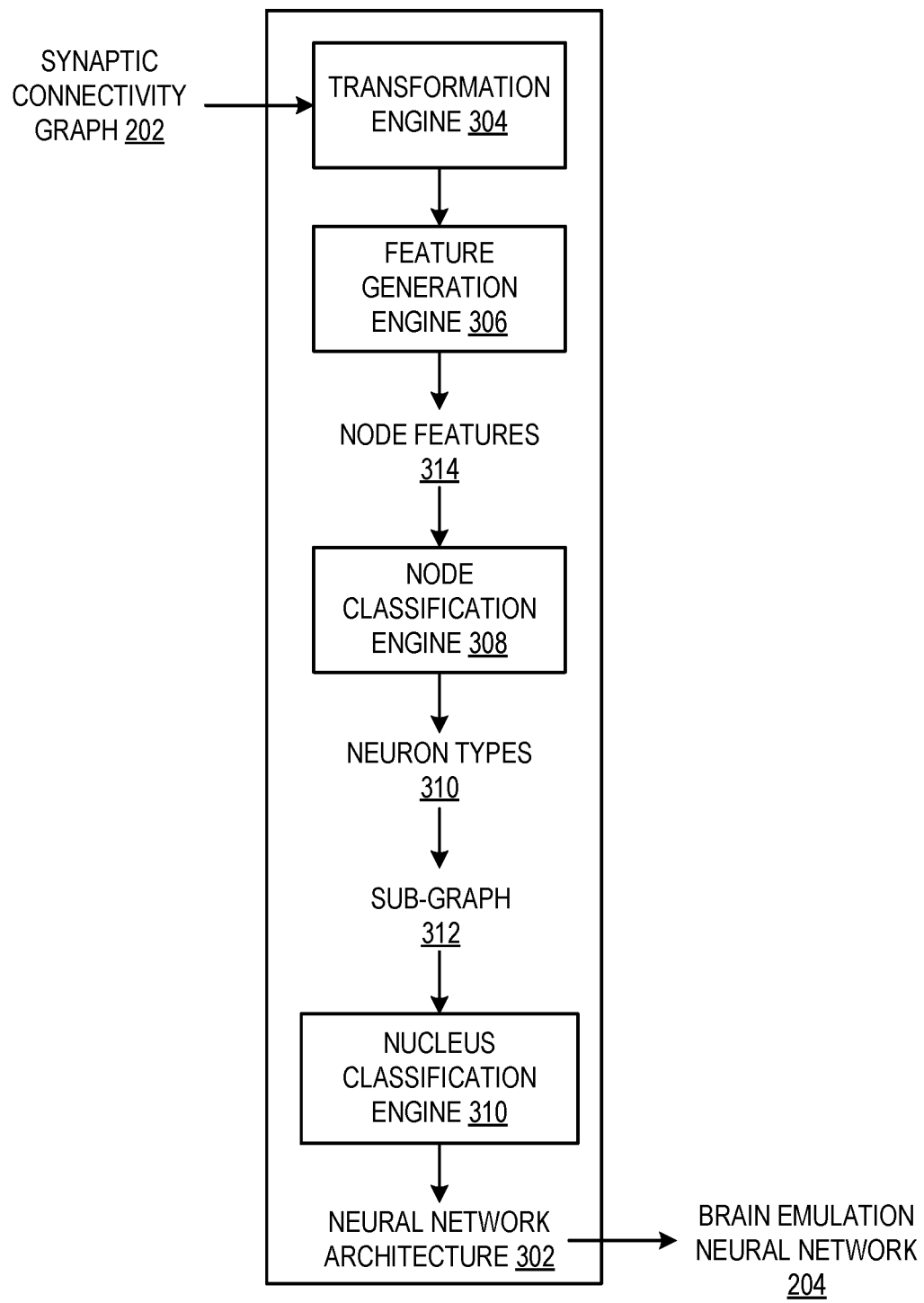
FIG. 3 shows an example architecture mapping system.

FIG. 3 shows an example architecture mapping system 300. The architecture mapping system 300 is an example of a system implemented as computer programs on one or more computers in one or more locations in which the systems, components, and techniques described below are implemented.

The architecture mapping system 300 is configured to process a synaptic connectivity graph 202 to determine a corresponding neural network architecture 302 of a brain emulation neural network 204. The architecture mapping system 300 may determine the architecture 302 using one or more of: a transformation engine 304, a feature generation engine 306, a node classification engine 308, and a nucleus classification engine 310, which will each be described in more detail next.

The transformation engine 304 may be configured to apply one or more transformation operations to the synaptic connectivity graph 202 that alter the connectivity of the graph 202, i.e., by adding or removing edges from the graph. A few examples of transformation operations follow.

In one example, to apply a transformation operation to the graph 202, the transformation engine 304 may randomly sample a set of node pairs from the graph (i.e., where each node pair specifies a first node and a second node). For example, the transformation engine may sample a predefined number of node pairs in accordance with a uniform probability distribution over the set of possible node pairs. For each sampled node pair, the transformation engine 304 may modify the connectivity between the two nodes in the node pair with a predefined probability (e.g., 0.1%). In one example, the transformation engine 304 may connect the nodes by an edge (i.e., if they are not already connected by an edge) with the predefined probability. In another example, the transformation engine 304 may reverse the direction of any edge connecting the two nodes with the predefined probability. In another example, the transformation engine 304 may invert the connectivity between the two nodes with the predefined probability, i.e., by adding an edge between the nodes if they are not already connected, and by removing the edge between the nodes if they are already connected.

In another example, the transformation engine 304 may apply a convolutional filter to a representation of the graph 202 as a two-dimensional array of numerical values. As described above, the graph 202 may be represented as a two-dimensional array of numerical values where the component of the array at position j) may have value 1 if the graph includes an edge pointing from node i to node j, and value 0 otherwise. The convolutional filter may have any appropriate kernel, e.g., a spherical kernel or a Gaussian kernel. After applying the convolutional filter, the transformation engine 304 may quantize the values in the array representing the graph, e.g., by rounding each value in the array to 0 or 1, to cause the array to unambiguously specify the connectivity of the graph. Applying a convolutional filter to the representation of the graph 202 may have the effect of regularizing the graph, e.g., by smoothing the values in the array representing the graph to reduce the likelihood of a component in the array having a different value than many its neighbors.

In some cases, the graph 202 may include some inaccuracies in representing the synaptic connectivity in the biological brain. For example, the graph may include nodes that are not connected by an edge despite the corresponding neurons in the brain being connected by a synapse, or "spurious" edges that connect nodes in the graph despite the corresponding neurons in the brain not being connected by a synapse. Inaccuracies in the graph may result, e.g., from imaging artifacts or ambiguities in the synaptic resolution image of the brain that is processed to generate the graph. Regularizing the graph, e.g., by applying a convolutional filter to the representation of the graph, may increase the accuracy with which the graph represents the synaptic connectivity in the brain, e.g., by removing spurious edges.

The architecture mapping system 300 may use the feature generation engine 306 and the node classification engine 308 to determine predicted "types" 310 of the neurons corresponding to the nodes in the graph 202. The type of a neuron may characterize any appropriate aspect of the neuron. In one example, the type of a neuron may characterize the function performed by the neuron in the brain, e.g., a visual function by processing visual data, an olfactory function by processing odor data, or a memory function by retaining information. After identifying the types of the neurons corresponding to the nodes in the graph 202, the architecture mapping system 300 may identify a sub-graph 312 of the overall graph 202 based on the neuron types, and determine the neural network architecture 302 based on the sub-graph 312. The feature generation engine 306 and the node classification engine 308 are described in more detail next.

The feature generation engine 306 may be configured to process the graph 202 (potentially after it has been modified by the transformation engine 304) to generate one or more respective node features 314 corresponding to each node of the graph 202. The node features corresponding to a node may characterize the topology (i.e., connectivity) of the graph relative to the node. In one example, the feature generation engine 306 may generate a node degree feature for each node in the graph 202, where the node degree feature for a given node specifies the number of other nodes that are connected to the given node by an edge. In another example, the feature generation engine 306 may generate a path length feature for each node in the graph 202, where the path length feature for a node specifies the length of the longest path in the graph starting from the node. A path in the graph may refer to a sequence of nodes in the graph, such that each node in the path is connected by an edge to the next node in the path. The length of a path in the graph may refer to the number of nodes in the path. In another example, the feature generation engine 306 may generate a neighborhood size feature for each node in the graph 202, where the neighborhood size feature for a given node specifies the number of other nodes that are connected to the node by a path of length at most N. In this example, N may be a positive integer value. In another example, the feature generation engine 306 may generate an information flow feature for each node in the graph 202. The information flow feature for a given node may specify the fraction of the edges connected to the given node that are outgoing edges, i.e., the fraction of edges connected to the given node that point from the given node to a different node.

In some implementations, the feature generation engine 306 may generate one or more node features that do not directly characterize the topology of the graph relative to the nodes. In one example, the feature generation engine 306 may generate a spatial position feature for each node in the graph 202, where the spatial position feature for a given node specifies the spatial position in the brain of the neuron corresponding to the node, e.g., in a Cartesian coordinate system of the synaptic resolution image of the brain. In another example, the feature generation engine 306 may generate a feature for each node in the graph 202 indicating whether the corresponding neuron is excitatory or inhibitory. In another example, the feature generation engine 306 may generate a feature for each node in the graph 202 that identifies the neuropil region associated with the neuron corresponding to the node.

In some cases, the feature generation engine 306 may use weights associated with the edges in the graph in determining the node features 314. As described above, a weight value for an edge connecting two nodes may be determined, e.g., based on the area of any overlap between tolerance regions around the neurons corresponding to the nodes. In one example, the feature generation engine 306 may determine the node degree feature for a given node as a sum of the weights corresponding to the edges that connect the given node to other nodes in the graph. In another example, the feature generation engine 306 may determine the path length feature for a given node as a sum of the edge weights along the longest path in the graph starting from the node.

The node classification engine 308 may be configured to process the node features 314 to identify a predicted neuron type 310 corresponding to certain nodes of the graph 202. In one example, the node classification engine 308 may process the node features 314 to identify a proper subset of the nodes in the graph 202 with the highest values of the path length feature. For example, the node classification engine 308 may identify the nodes with a path length feature value greater than the 90th percentile (or any other appropriate percentile) of the path length feature values of all the nodes in the graph. The node classification engine 308 may then associate the identified nodes having the highest values of the path length feature with the predicted neuron type of "primary sensory neuron." In another example, the node classification engine 308 may process the node features 314 to identify a proper subset of the nodes in the graph 202 with the highest values of the information flow feature, i.e., indicating that many of the edges connected to the node are outgoing edges. The node classification engine 308 may then associate the identified nodes having the highest values of the information flow feature with the predicted neuron type of "sensory neuron." In another example, the node classification engine 308 may process the node features 314 to identify a proper subset of the nodes in the graph 202 with the lowest values of the information flow feature, i.e., indicating that many of the edges connected to the node are incoming edges (i.e., edges that point towards the node). The node classification engine 308 may then associate the identified nodes having the lowest values of the information flow feature with the predicted neuron type of "associative neuron."

Figure 4:
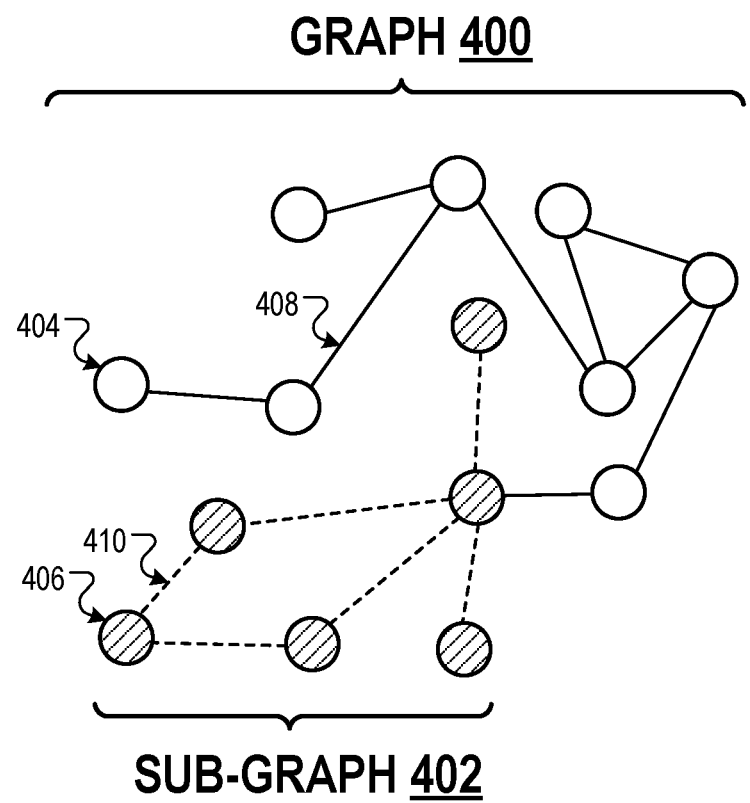
FIG. 4 illustrates an example graph and an example sub-graph.

The architecture mapping system 300 may identify a sub-graph 312 of the overall graph 202 based on the predicted neuron types 310 corresponding to the nodes of the graph 202. A "sub-graph" may refer to a graph specified by: (i) a proper subset of the nodes of the graph 202, and (ii) a proper subset of the edges of the graph 202. FIG. 4 provides an illustration of an example sub-graph of an overall graph. In one example, the architecture mapping system 300 may select: (i) each node in the graph 202 corresponding to a particular neuron type, and (ii) each edge in the graph 202 that connects nodes in the graph corresponding to the particular neuron type, for inclusion in the sub-graph 312. The neuron type selected for inclusion in the sub-graph may be, e.g., visual neurons, olfactory neurons, memory neurons, or any other appropriate type of neuron. In some cases, the architecture mapping system 300 may select multiple neuron types for inclusion in the sub-graph 312, e.g., both visual neurons and olfactory neurons.

The type of neuron selected for inclusion in the sub-graph 312 may be determined based on the task which the brain emulation neural network 204 will be configured to perform. In one example, the brain emulation neural network 204 may be configured to perform an image processing task, and neurons that are predicted to perform visual functions (i.e., by processing visual data) may be selected for inclusion in the sub-graph 312. In another example, the brain emulation neural network 204 may be configured to perform an odor processing task, and neurons that are predicted to perform odor processing functions (i.e., by processing odor data) may be selected for inclusion in the sub-graph 312. In another example, the brain emulation neural network 204 may be configured to perform an audio processing task, and neurons that are predicted to perform audio processing (i.e., by processing audio data) may be selected for inclusion in the sub-graph 312.

If the edges of the graph 202 are associated with weight values (as described above), then each edge of the sub-graph 312 may be associated with the weight value of the corresponding edge in the graph 202. The sub-graph 312 may be represented, e.g., as a two-dimensional array of numerical values, as described with reference to the graph 202.

Determining the architecture 302 of the brain emulation neural network 204 based on the sub-graph 312 rather than the overall graph 202 may result in the architecture 302 having a reduced complexity, e.g., because the sub-graph 312 has fewer nodes, fewer edges, or both than the graph 202. Reducing the complexity of the architecture 302 may reduce consumption of computational resources (e.g., memory and computing power) by the brain emulation neural network 204, e.g., enabling the brain emulation neural network 204 to be deployed in resource-constrained environments, e.g., mobile devices. Reducing the complexity of the architecture 302 may also facilitate training of the brain emulation neural network 204, e.g., by reducing the amount of training data required to train the brain emulation neural network 204 to achieve an threshold level of performance (e.g., prediction accuracy).

In some cases, the architecture mapping system 300 may further reduce the complexity of the architecture 302 using a nucleus classification engine 310. In particular, the architecture mapping system 300 may process the sub-graph 312 using the nucleus classification engine 310 prior to determining the architecture 302. The nucleus classification engine 310 may be configured to process a representation of the sub-graph 312 as a two-dimensional array of numerical values (as described above) to identify one or more "clusters" in the array.

A cluster in the array representing the sub-graph 312 may refer to a contiguous region of the array such that at least a threshold fraction of the components in the region have a value indicating that an edge exists between the pair of nodes corresponding to the component. In one example, the component of the array in position (i,j) may have value 1 if an edge exists from node i to node j, and value 0 otherwise. In this example, the nucleus classification engine 310 may identify contiguous regions of the array such that at least a threshold fraction of the components in the region have the value 1. The nucleus classification engine 310 may identify clusters in the array representing the sub-graph 312 by processing the array using a blob detection algorithm, e.g., by convolving the array with a Gaussian kernel and then applying the Laplacian operator to the array. After applying the Laplacian operator, the nucleus classification engine 310 may identify each component of the array having a value that satisfies a predefined threshold as being included in a cluster.

Each of the clusters identified in the array representing the sub-graph 312 may correspond to edges connecting a "nucleus" (i.e., group) of related neurons in brain, e.g., a thalamic nucleus, a vestibular nucleus, a dentate nucleus, or a fastigial nucleus. After the nucleus classification engine 310 identifies the clusters in the array representing the sub-graph 312, the architecture mapping system 300 may select one or more of the clusters for inclusion in the sub-graph 312. The architecture mapping system 300 may select the clusters for inclusion in the sub-graph 312 based on respective features associated with each of the clusters. The features associated with a cluster may include, e.g., the number of edges (i.e., components of the array) in the cluster, the average of the node features corresponding to each node that is connected by an edge in the cluster, or both. In one example, the architecture mapping system 300 may select a predefined number of largest clusters (i.e., that include the greatest number of edges) for inclusion in the sub-graph 312.

The architecture mapping system 300 may reduce the sub-graph 312 by removing any edge in the sub-graph 312 that is not included in one of the selected clusters, and then map the reduced sub-graph 312 to a corresponding neural network architecture, as will be described in more detail below. Reducing the sub-graph 312 by restricting it to include only edges that are included in selected clusters may further reduce the complexity of the architecture 302, thereby reducing computational resource consumption by the brain emulation neural network 204 and facilitating training of the brain emulation neural network 204.

The architecture mapping system 300 may determine the architecture 302 of the brain emulation neural network 204 from the sub-graph 312 in any of a variety of ways. For example, the architecture mapping system 300 may map each node in the sub-graph 312 to a corresponding: (i) artificial neuron, (ii) artificial neural network layer, or (iii) group of artificial neural network layers in the architecture 302, as will be described in more detail next.

In one example, the neural network architecture 302 may include: (i) a respective artificial neuron corresponding to each node in the sub-graph 312, and (ii) a respective connection corresponding to each edge in the sub-graph 312. In this example, the sub-graph 312 may be a directed graph, and an edge that points from a first node to a second node in the sub-graph 312 may specify a connection pointing from a corresponding first artificial neuron to a corresponding second artificial neuron in the architecture 302. The connection pointing from the first artificial neuron to the second artificial neuron may indicate that the output of the first artificial neuron should be provided as an input to the second artificial neuron. Each connection in the architecture may be associated with a weight value, e.g., that is specified by the weight value associated with the corresponding edge in the sub-graph. An artificial neuron may refer to a component of the architecture 302 that is configured to receive one or more inputs (e.g., from one or more other artificial neurons), and to process the inputs to generate an output. The inputs to an artificial neuron and the output generated by the artificial neuron may be represented as scalar numerical values. In one example, a given artificial neuron may generate an output b as:

$$b = \sigma\left(\sum_{i=1}^{n} w_i \cdot a_i\right) \quad (1)$$

where $\sigma(\cdot)$ is a non-linear "activation" function (e.g., a sigmoid function or an arctangent function), $\{a_i\}_{i=1}^{n}$ are the inputs provided to the given artificial neuron, and $\{w_i\}_{i=1}^{n}$ are the weight values associated with the connections between the given artificial neuron and each of the other artificial neurons that provide an input to the given artificial neuron.

In another example, the sub-graph 312 may be an undirected graph, and the architecture mapping system 300 may map an edge that connects a first node to a second node in the sub-graph 312 to two connections between a corresponding first artificial neuron and a corresponding second artificial neuron in the architecture. In particular, the architecture mapping system 300 may map the edge to: (i) a first connection pointing from the first artificial neuron to the second artificial neuron, and (ii) a second connection pointing from the second artificial neuron to the first artificial neuron.

In another example, the sub-graph 312 may be an undirected graph, and the architecture mapping system may map an edge that connects a first node to a second node in the sub-graph 312 to one connection between a corresponding first artificial neuron and a corresponding second artificial neuron in the architecture. The architecture mapping system 300 may determine the direction of the connection between the first artificial neuron and the second artificial neuron, e.g., by randomly sampling the direction in accordance with a probability distribution over the set of two possible directions.

In some cases, the edges in the sub-graph 312 may not be associated with weight values, and the weight values corresponding to the connections in the architecture 302 may be determined randomly. For example, the weight value corresponding to each connection in the architecture 302 may be randomly sampled from a predetermined probability distribution, e.g., a standard Normal (N(0,1)) probability distribution.

In another example, the neural network architecture 302 may include: (i) a respective artificial neural network layer corresponding to each node in the sub-graph 312, and (ii) a respective connection corresponding to each edge in the sub-graph 312. In this example, a connection pointing from a first layer to a second layer may indicate that the output of the first layer should be provided as an input to the second layer. An artificial neural network layer may refer to a collection of artificial neurons, and the inputs to a layer and the output generated by the layer may be represented as ordered collections of numerical values (e.g., tensors of numerical values). In one example, the architecture 302 may include a respective convolutional neural network layer corresponding to each node in the sub-graph 312, and each given convolutional layer may generate an output d as:

$$d = \sigma\left(h_\theta\left(\sum_{i=1}^{n} w_i \cdot c_i\right)\right) \quad (2)$$

where each $c_i$ (i=1, ..., n) is a tensor (e.g., a two- or three-dimensional array) of numerical values provided as an input to the layer, each $w_i$ (i=1, ..., n) is a weight value associated with the connection between the given layer and each of the other layers that provide an input to the given layer (where the weight value for each edge may be specified by the weight value associated with the corresponding edge in the sub-graph), $h_\theta(\cdot)$ represents the operation of applying one or more convolutional kernels to an input to generate a corresponding output, and $\sigma(\cdot)$ is a non-linear activation function that is applied element-wise to each component of its input. In this example, each convolutional kernel may be represented as an array of numerical values, e.g., where each component of the array is randomly sampled from a predetermined probability distribution, e.g., a standard Normal probability distribution.

In another example, the architecture mapping system 300 may determine that the neural network architecture includes: (i) a respective group of artificial neural network layers corresponding to each node in the sub-graph 312, and (ii) a respective connection corresponding to each edge in the sub-graph 312. The layers in a group of artificial neural network layers corresponding to a node in the sub-graph 312 may be connected, e.g., as a linear sequence of layers, or in any other appropriate manner.

The neural network architecture 302 may include one or more artificial neurons that are identified as "input" artificial neurons and one or more artificial neurons that are identified as "output" artificial neurons. An input artificial neuron may refer to an artificial neuron that is configured to receive an input from a source that is external to the brain emulation neural network 204. An output artificial neural neuron may refer to an artificial neuron that generates an output which is considered part of the overall output generated by the brain emulation neural network 204. The architecture mapping system 300 may add artificial neurons to the architecture 302 in addition to those specified by nodes in the sub-graph 312 (or the graph 202), and designate the added neurons as input artificial neurons and output artificial neurons. For example, for a brain emulation neural network 204 that is configured to process an input including a 100×100 image to generate an output indicating whether the image is included in each of 1000 categories, the architecture mapping system 300 may add 10,000 (=100×100) input artificial neurons and 1000 output artificial neurons to the architecture. Input and output artificial neurons that are added to the architecture 302 may be connected to the other neurons in the architecture in any of a variety of ways. For example, the input and output artificial neurons may be densely connected to every other neuron in the architecture.

Various operations performed by the described architecture mapping system 300 are optional or may be implemented in a different order. For example, the architecture mapping system 300 may refrain from applying transformation operations to the graph 202 using the transformation engine 304, and refrain from extracting a sub-graph 312 from the graph 202 using the feature generation engine 306, the node classification engine 308, and the nucleus classification engine 310. In this example, the architecture mapping system 300 may directly map the graph 202 to the neural network architecture 302, e.g., by mapping each node in the graph to an artificial neuron and mapping each edge in the graph to a connection in the architecture, as described above.

FIG. 4 illustrates an example graph 400 and an example sub-graph 402. Each node in the graph 400 is represented by a circle (e.g., 404 and 406), and each edge in the graph 400 is represented by a line (e.g., 408 and 410). In this illustration, the graph 400 may be considered a simplified representation of a synaptic connectivity graph (an actual synaptic connectivity graph may have far more nodes and edges than are depicted in FIG. 4). A sub-graph 402 may be identified in the graph 400, where the sub-graph 402 includes a proper subset of the nodes and edges of the graph 400. In this example, the nodes included in the sub-graph 402 are hatched (e.g., 406) and the edges included in sub-graph 402 are dashed (e.g., 410). The nodes included in the sub-graph 402 may correspond to neurons of a particular type, e.g., neurons having a particular function, e.g., olfactory neurons, visual neurons, or memory neurons. The architecture of the brain emulation neural network may be specified by the structure of the entire graph 400, or by the structure of a sub-graph 402, as described above.

Figure 5:
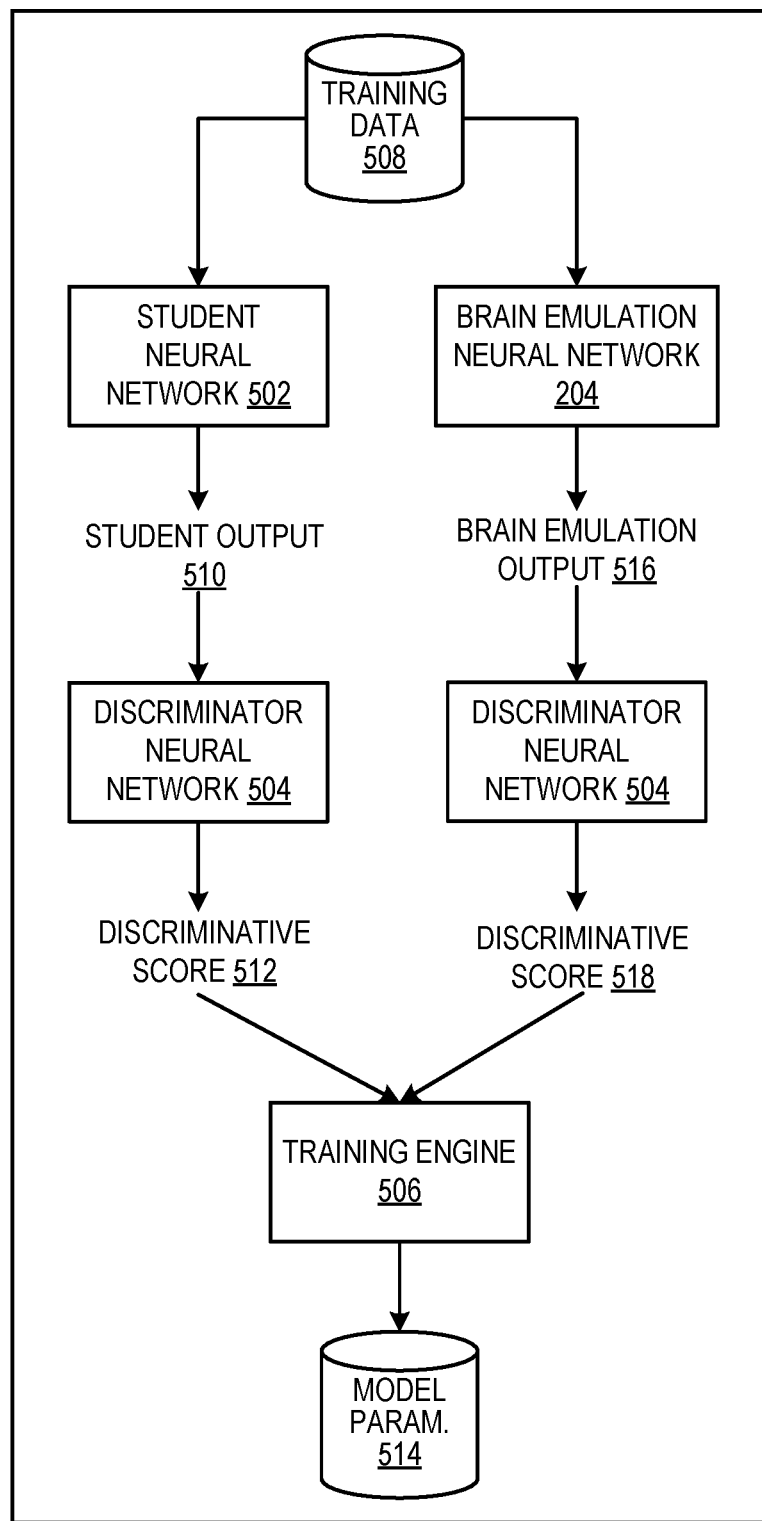
FIG. 5 shows an example adversarial training system.

FIG. 5 shows an example adversarial training system 500. The adversarial training system 500 is an example of a system implemented as computer programs on one or more computers in one or more locations in which the systems, components, and techniques described below are implemented.

The adversarial training system 500 is configured to train a "student" neural network 502 to generate outputs that imitate (i.e., that have similar characteristics to) outputs generated by a brain emulation neural network 204. More specifically, the adversarial training system 500 jointly trains the student neural network 502 and a "discriminator" neural network 504. The adversarial training system 500 trains the discriminator neural network 504 to process an input to generate a discriminative score that classifies whether the input was generated by: (i) the student neural network 502, or (ii) the brain emulation neural network 204. In parallel, the adversarial training system 500 trains the student neural network 502 to generate outputs which the discriminator neural network 504 misclassifies as having been generated by the brain emulation neural network 204.

The brain emulation neural network 204 has an architecture based on a graph representing synaptic connectivity between neurons in the brain of a biological organism. In some cases, the architecture of the brain emulation neural network 204 may be specified by the synaptic connectivity between neurons of a particular type in the brain, e.g., neurons from the visual system or the olfactory system, as described above. The brain of the biological organism may be adapted by evolutionary pressures to be effective at solving certain tasks. For example, in contrast to many conventional computer vision techniques, a biological brain may process visual data to generate a robust representation of the visual data that may be insensitive to factors such as the orientation and size of elements (e.g., objects) characterized by the visual data. The brain emulation neural network 204 may also be effective at solving these (and other) tasks as a result of having an architecture that matches the biological brain.

Processing data using the brain emulation neural network 204 may be computationally expensive due to the complexity of the architecture of the brain emulation neural network 204. Generally, the student neural network 502 may have a less complex neural network architecture than the brain emulation neural network 204. Therefore, training the student neural network 502 to imitate the brain emulation neural network 204 may enable the student neural network 502 to inherit the capacity of the brain emulation neural network 204 to effectively solve certain tasks, while consuming fewer computational resources than the brain emulation neural network 204.

The student neural network 502 may be configured to process any of a variety of possible network inputs, e.g., image data, video data, audio data, odor data, point cloud data (e.g., generated by a lidar or radar sensor), position and velocity data (e.g., characterizing the motion of an agent), magnetic field data, or a combination thereof. The student neural network 502 may be configured to generate any of a variety of possible network outputs, e.g., networks outputs that are embeddings of the corresponding network inputs. An embedding of a network input may refer to an ordered collection of numerical values (e.g., a vector or matrix of numerical values) representing the network input. For example, an embedding of a network input may be a compact representation of the network input that implicitly encodes features (e.g., semantic features) of the network input. The student neural network 502 may have any appropriate neural network architecture, e.g., a feedforward neural network architecture or a recurrent neural network architecture. In one example, the student neural network 502 may have an architecture matching the AlexNet, which is described with reference to: A. Krizhevsky, I. Sutskever, G. E. Hinton: "ImageNet Classification with Deep Convolutional Neural Networks", Advances in Neural Information Processing Systems 25 (NeurIPS), 2012.

The brain emulation neural network 204 is configured to process network inputs having the same form as those processed by the student neural network 502, and to generate network outputs having the same form as those generated by the student neural network 502. For example, the brain emulation neural network 204 and the student neural network 502 may both be configured to process 500×500 images to generate 50×1 embeddings of the images. The form of the input layer and the output layer of the brain emulation neural network 204 may be adjusted as necessary to enable the brain emulation neural network 204 to accommodate network inputs and network outputs having a specified format.

The discriminator neural network 504 is configured to process a network input to generate a discriminative score that classifies whether the network input was generated by: (i) the student neural network 502, or (ii) the brain emulation neural network 204. For example, the discriminative score may be a probability value (i.e., a numerical value in the range [0,1]) representing a likelihood that the network input was generated by the brain emulation neural network 204 rather than the student neural network 502. The discriminator neural network 504 can have any appropriate neural network architecture that enables it to perform its described function. In one example, the discriminator neural network 504 may have an architecture specified by a sequence of convolutional layers followed by a fully-connected output layer.

The adversarial training system 500 uses a training engine 506 to jointly train the student neural network 502 and the discriminator neural network 504 on a set of training data 508. The training data 508 includes a set of network inputs that may be processed by the student neural network 502 and the brain emulation neural network 204.

The training engine 506 may train the student neural network 502 by, at each of multiple training iterations, sampling a "batch" (i.e., set) of network inputs from the training data 508 and processing the network inputs using the student neural network 502 to generate corresponding outputs 510. The training engine 506 may process the outputs 510 generated by the student neural network 502 using the discriminator neural network 504 to generate a corresponding discriminative score 512 for each of the outputs 510 generated by the student neural network 502. The training engine 506 may then adjust the model parameters 514 of the student neural network 502 to optimize (e.g., minimize) an objective function based on the discriminative scores 512. In one example, the objective function $L_{student}$ may be given by:

$$L_{student} = \sum_{i=1}^{N} \log(1 - D(S_i)) \quad (3)$$

where N is the number of network inputs in the current batch, $S_i$ is the student neural network output for the i-th network input in the current batch, and $D(S_i)$ is the discriminative score for $S_i$.

To train the student neural network 502, the training engine 506 may determine gradients of the objective function with respect to the model parameters of the student neural network (e.g., using backpropagation techniques), and adjust the current values of the model parameters of the student neural network using the gradients. The training engine 506 may adjust the current values of the model parameters of the student neural network, e.g., using an RMSprop or Adam gradient descent optimization technique. Generally, updating the model parameters of the student neural network to optimize the objective function may encourage the student neural network to generate outputs that are misclassified by the discriminator neural network as having been generated by the brain emulation neural network.

The training engine 506 may train the discriminator neural network 504 by, at each of multiple training iterations, sampling a batch of network inputs from the training data 508 and processing the network inputs using the brain emulation neural network 204 to generate corresponding outputs 516. The training engine 506 may process the outputs 516 generated by the brain emulation neural network 204 using the discriminator neural network 504 to generate corresponding discriminative scores 518. The training engine 506 may further sample another batch of network inputs from the training data 508 and process the network inputs using the student neural network 502 to generate corresponding outputs 510. The training engine 506 may process the outputs 510 generated by the student neural network 502 using the discriminator neural network 504 to generate corresponding discriminative scores 512. The training engine 506 may then adjust the model parameters 514 of the discriminator neural network 504 to optimize (e.g., minimize) an objective function based on the discriminative scores (512, 518) generated by the discriminator neural network 504. In one example, the objective function $L_{discriminator}$ may be given by:

$$L_{discriminator} = -\sum_{j=1}^{M} \log(D(B_j)) - \sum_{i=1}^{N} \log(1 - D(S_i)) \quad (4)$$

where M is the number of network inputs in the current batch processed by the brain emulation neural network, $B_j$ is the brain emulation neural network output for the j-th network input processed by the brain emulation neural network, $D(B_j)$ is the discriminative score for $B_j$, N is the number of network inputs in the current batch processed by the student neural network, $S_i$ is the student neural network output for the i-th network input processed by the student neural network, and $D(S_i)$ is the discriminative score for $S_i$.

To train the discriminator neural network 504, the training engine 506 may determine gradients of the objective function with respect to the model parameters of the discriminator neural network (e.g., using backpropagation techniques), and adjust the current values of the model parameters of the discriminator neural network using the gradients. The training engine 506 may adjust the current values of the model parameters of the discriminator neural network, e.g., using an RMSprop or Adam gradient descent optimization technique. Generally, updating the model parameters of the discriminator neural network to optimize the objective function may encourage the discriminator neural network to distinguish more accurately between outputs generated by the student neural network and outputs generated by the brain emulation neural network.

The adversarial training system 500 may alternate between training the student neural network 502 and training the discriminator neural network 504. For example, the adversarial training system 500 may train the student neural network 502 for one or more training iterations using discriminative scores generated in accordance with the current values of the discriminator neural network parameters. The adversarial training system 500 may then train the discriminator neural network 504 for one or more training iterations using outputs generated by the student neural network in accordance with the current values of the student neural network parameters, before reverting back to training the discriminator neural network. In this manner, the student neural network may continuously learn to generate outputs that imitate the brain emulation neural network more effectively, and the discriminator neural network may continuously adapt to identify differences between outputs generated by the brain emulation neural network and outputs generated by the student neural network.

Generally, the adversarial training system 500 is not required to train the parameter values of the brain emulation neural network during the joint training of the student neural network 502 and the discriminator neural network 504. Rather, the weight values corresponding to the connections between the artificial neurons of the brain emulation neural network 204 may be randomly generated or derived from the synaptic resolution image of the biological brain, as described above. Even in implementations where the parameter values of the brain emulation neural network 204 are randomly generated, the behavior of the brain emulation neural network may still have desirable properties that result from the architecture of the brain emulation neural network (i.e., independently of the weight values).

After being trained to imitate the brain emulation neural network 204, the student neural network 502 can be used for any of a variety of purposes. In one example, the student neural network 502 may generate image embeddings that are processed to perform object classification. In another example, the student neural network 502 may generate audio data embeddings that are processed to perform speech recognition tasks. In another example, the student neural network may process sequences of network inputs to generate corresponding sequences of network outputs that are used for navigation purposes, i.e., that are provided to a navigation system.

Generally, the adversarial training system 500 may be understood as training the student neural network 502 to imitate the brain emulation neural network 204 by causing the student neural network 502 to generate outputs having similar characteristics to the outputs generated by the brain emulation neural network. For example, after being trained, the student neural network 502 and the brain emulation neural network 204 may induce similar distributions over the space of possible network outputs. However, for any given network input, the student neural network 502 and the brain emulation neural network 204 may generate substantially different outputs. In contrast, the distillation training system which will be described in more detail next with reference to FIG. 6 may train the student neural network 502 to match the output generated by the brain emulation neural network for each network input.

Figure 6:
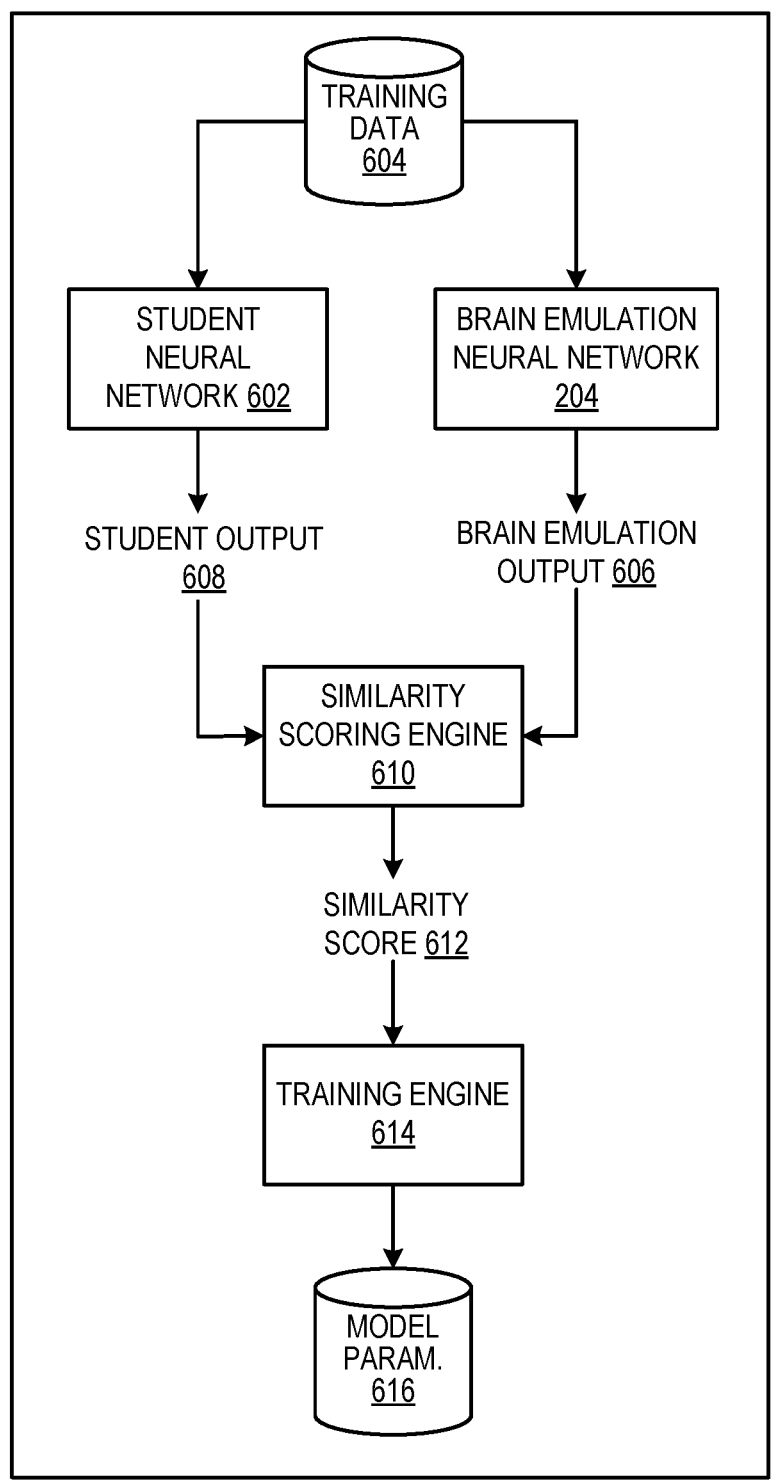
FIG. 6 shows an example distillation training system.

FIG. 6 shows an example distillation training system 600. The distillation training system 600 is an example of a system implemented as computer programs on one or more computers in one or more locations in which the systems, components, and techniques described below are implemented.

The distillation training system 600 trains a student neural network 602 to process network inputs to generate network outputs that match those generated by a brain emulation neural network 204 by processing the same network inputs. Generally, both the student neural network 602 and the brain emulation neural network 204 are configured to process a network input to generate a network output that includes a respective score for each of multiple classes. A few examples follow.

In one example, the brain emulation neural network 204 may be configured to generate a classification output that classifies the network input into a predefined number of possible categories. For example, the network input may be an image, each category may specify a type of object (e.g., person, vehicle, building, and the like), and the brain emulation neural network 204 may classify an image into a category if the image depicts an object included in the category. As another example, the network input may be an odor, each category may specify a type of odor, and the brain emulation neural network 204 may classify an odor into a category if the odor is of the type specified by the category.

In another example, the brain emulation neural network 204 may be configured to generate action selection outputs that can be used to select actions to be performed by an agent interacting with an environment. For example, the action selection output may specify a respective score for each action in a set of possible actions that can be performed by the agent, and the agent may select the action to be performed by sampling an action in accordance with the action scores. In one example, the agent may be a mechanical agent (e.g., a robot or an autonomous vehicle) interacting with a real-world environment to perform a navigation task (e.g., reaching a goal location in the environment), and the actions performed by the agent cause the agent to navigate through the environment.

The brain emulation neural network 204 may have an architecture that is based on a graph representing synaptic connectivity between neurons in the brain of a biological organism. In some cases, the architecture of the brain emulation neural network 204 may be specified by the synaptic connectivity between neurons of a particular type in the brain, e.g., neurons from the visual system or the olfactory system, as described above. The brain of the biological organism may be adapted by evolutionary pressures to be effective at solving certain tasks, and the brain emulation neural network 204 may also be effective at solving these (and other) tasks as a result of having an architecture that matches the biological brain. However, processing data using the brain emulation neural network 204 may be computationally expensive, due to the complexity of the architecture of the brain emulation neural network 204. Generally, the student neural network 602 may have a less complex neural network architecture than the brain emulation neural network 204. Training the student neural network 602 to imitate the brain emulation neural network 204 may enable the student neural network 602 to inherit the capacity of the brain emulation neural network 204 to effectively solve certain tasks, while consuming fewer computational resources than the brain emulation neural network 204.

Unlike in the adversarial training system described with reference to FIG. 5, the distillation training system 600 requires that the parameter (weight) values of the brain emulation neural network be trained to perform the task, e.g., rather than being randomly generated. In some cases, the distillation training system 600 may train the brain emulation neural network prior to training the student neural network, while in other cases, the distillation training system 600 may jointly train the brain emulation neural network and the student neural network.

The distillation training system 600 may use a training engine 614 to train the brain emulation neural network 204 on training data 604 that includes a set of training examples. Each training example may specify: (i) a training input, and (ii) a target output that should be generated by the brain emulation neural network 204 by processing the training input. The training engine 614 may train the brain emulation neural network 204 on the training data 604 over multiple training iterations. At each training iteration, the training engine 614 may sample a batch of training examples, and process the training inputs specified by the training examples using the brain emulation neural network to generate corresponding outputs. The training engine 614 may then determine gradients of an objective function measuring a similarity between: (i) the target outputs specified by the training examples, and (ii) the outputs generated by the brain emulation neural network. The objective function may be, e.g., a cross-entropy objective function. The training engine 614 may determine the gradients of the objective function with respect to the model parameters of the brain emulation neural network, e.g., using backpropagation techniques. The training engine 614 may use the gradients to adjust the current values of the model parameters of the brain emulation neural network, e.g., using an RMSprop or Adam gradient descent optimization technique.

The distillation training system 600 may use the training engine 614 to train the model parameters 616 of the student neural network 602 over multiple training iterations. At each training iteration, the training engine 614 may sample a batch of training inputs from the training data 604, and process the training inputs using the brain emulation neural network 204 to generate corresponding outputs 606. The training engine 614 may further process each sampled training input using the student neural network 602 to generate a corresponding output 608. The training engine 614 may provide the student output 608 and the brain emulation output 606 for each training input to a similarity scoring engine 610 to generate a similarity score 612. The similarity scores 612 may measure a similarity between: (i) the student output 608, and (ii) the brain emulation output 606, for each training input. The similarity scoring engine 610 may compute the similarity score between a student output 608 and a brain emulation output 606, e.g., as a cross-entropy similarity measure, or using any other appropriate similarity measure. The training engine 614 may determine gradients of an objective function that is based on the respective similarity score 612 for each training example, e.g., using backpropagation techniques. The training engine 614 may then use the gradients to adjust the current model parameter values 616 of the student neural network 602, e.g., using an RMSprop or Adam gradient descent optimization technique. In one example, the objective function may be given by:

$$L_{distillation} = -\sum_{i=1}^{N} S(B_i, S_i) \quad (5)$$

where N is the number of training examples in the current batch, $B_i$ is the brain emulation neural network output for the i-th training example, $S_i$ is the student output for the i-th training example, and $S(\cdot)$ is a similarity measure, e.g., a cross-entropy similarity measure.

Generally, the output generated by the brain emulation neural network 204 by processing a training input specifies a respective "soft" score for each possible class, i.e., scores that may indicate respective positive probabilities that the training input may be in each of multiple classes. For example, the soft scores generated by the brain emulation neural network 204 for a training image may specify an 85% likelihood that the image depicts a truck, a 12% likelihood that the image depicts a car, and various (small) positive likelihoods that the image depicts each of multiple other objects. In contrast, the target output for a training input specifies a "hard" score for each possible class, e.g., scores that indicate with 100% likelihood that an image depicts a truck, and 0% likelihoods that the image depicts other possible objects. Training the student neural network 602 to match the soft outputs generated by the brain emulation neural network enables the student neural network to leverage the classification uncertainty encoded in the soft outputs, and may therefore facilitate training of the student neural network more effectively than the hard target outputs.

After being trained by the distillation training system 600, the student neural network may have a prediction accuracy comparable to that of the brain emulation neural network, while having a substantially less complex neural network architecture and therefore consuming fewer computational resources than the brain emulation neural network.

Figure 7:
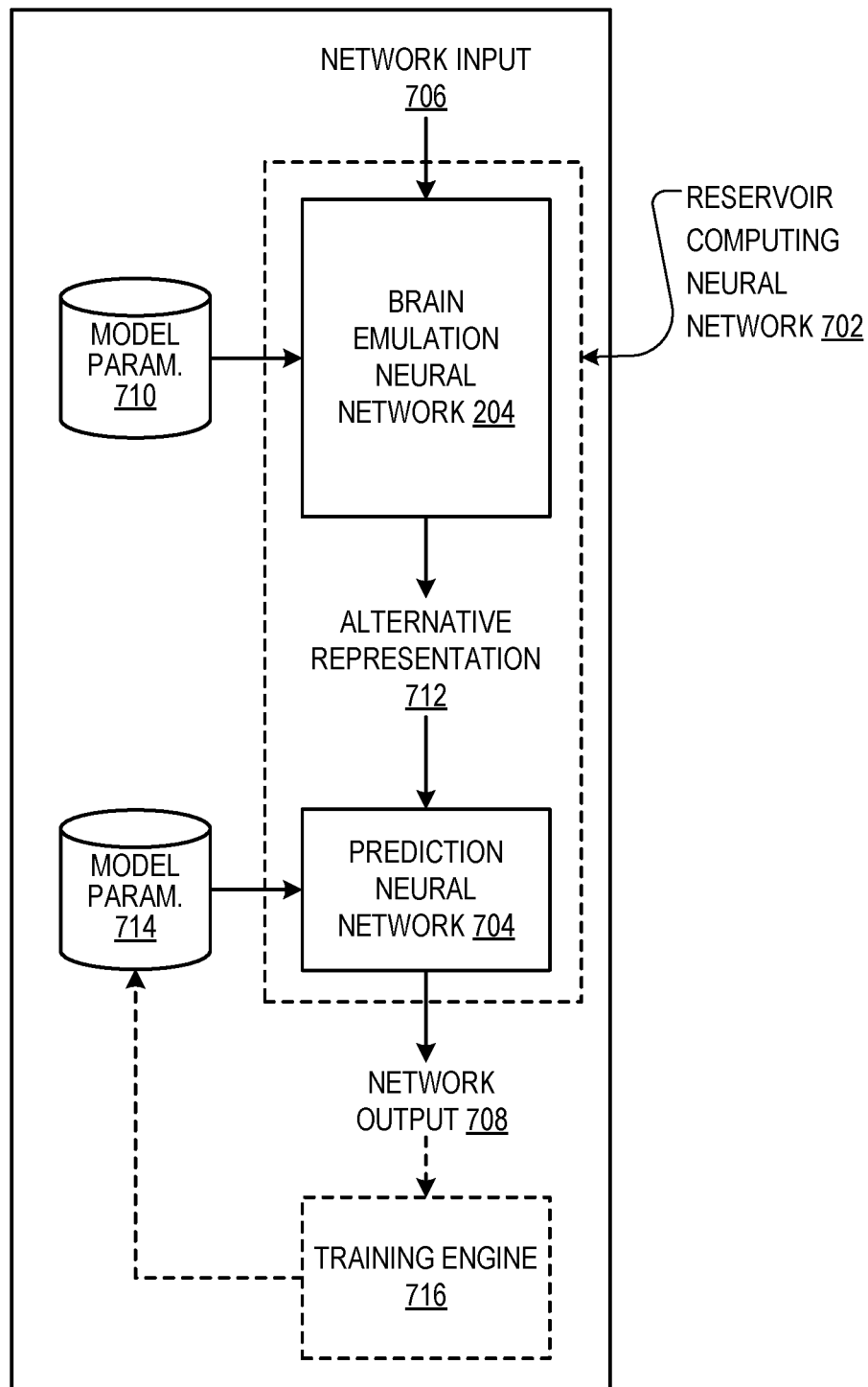
FIG. 7 shows an example reservoir computing system.

FIG. 7 shows an example reservoir computing system 700. The reservoir computing system 700 is an example of a system implemented as computer programs on one or more computers in one or more locations in which the systems, components, and techniques described below are implemented.

The reservoir computing system 700 includes a reservoir computing neural network 702 having two sub-networks: (i) a brain emulation neural network 204, and (ii) a prediction neural network 704. The reservoir computing neural network 702 is configured to process a network input 706 to generate a network output 708. More specifically, the brain emulation neural network 204 is configured to process the network input 706 in accordance with a set of model parameters 710 of the brain emulation neural network 204 to generate an alternative representation 712 of the network input 706. The prediction neural network 704 is configured to process the alternative representation 712 of the network input 706 in accordance with a set of model parameters 714 of the prediction neural network 704 to generate the network output 708.

The brain emulation neural network 204 may have an architecture that is based on a graph representing synaptic connectivity between neurons in the brain of a biological organism. In some cases, the architecture of the brain emulation neural network 204 may be specified by the synaptic connectivity between neurons of a particular type in the brain, e.g., neurons from the visual system or the olfactory system, as described above. Generally, the brain emulation neural network 204 has a more complex neural network architecture than the prediction neural network 704. In one example, the prediction neural network 704 may include only one neural network layer (e.g., a fully-connected layer) that processes the alternative representation 712 of the network input 706 to generate the network output 708.

In some cases, the brain emulation neural network 204 may have a recurrent neural network architecture, i.e., where the connections in the architecture define one or more "loops." More specifically, the architecture may include a sequence of components (e.g., artificial neurons, layers, or groups of layers) such that the architecture includes a connection from each component in the sequence to the next component, and the first and last components of the sequence are identical. In one example, two artificial neurons that are each directly connected to one another (i.e., where the first neuron provides its output the second neuron, and the second neuron provides its output to the first neuron) would form a recurrent loop. A recurrent brain emulation neural network may process a network input over multiple (internal) time steps to generate a respective alternative representation 712 of the network input at each time step. In particular, at each time step, the brain emulation neural network may process: (i) the network input, and (ii) any outputs generated by the brain emulation neural network at the preceding time step, to generate the alternative representation for the time step. The reservoir computing neural network 702 may provide the alternative representation of the network input generated by the brain emulation neural network at the final time step as the input to the prediction neural network 704. The number of time steps over which the brain emulation neural network 204 processes a network input may be a predetermined hyper-parameter of the reservoir computing system 700.

In addition to processing the alternative representation 712 generated by the output layer of the brain emulation neural network 204, the prediction neural network 704 may additionally process one or more intermediate outputs of the brain emulation neural network 204. An intermediate output refers to an output generated by a hidden artificial neuron of the brain emulation neural network, i.e., an artificial neuron that is not included in the input layer or the output layer of the brain emulation neural network.

The reservoir computing system 700 includes a training engine 716 that is configured to train the reservoir computing neural network 702. Training the reservoir computing neural network 702 from end-to-end (i.e., training both the model parameters 710 of the brain emulation neural network 204 and the model parameters 714 of the prediction neural network 704) may be difficult due to the complexity of the architecture of the brain emulation neural network. In particular, the brain emulation neural network may have a very large number of trainable parameters and may have a highly recurrent architecture (i.e., an architecture that includes loops, as described above). Therefore, training the reservoir computing neural network 702 from end-to-end using machine learning training techniques may be computationally-intensive and the training may fail to converge, e.g., if the values of the model parameters of the reservoir computing neural network 702 oscillate rather than converging to fixed values. Even in cases where the training of the reservoir computing neural network 702 converges, the performance of the reservoir computing neural network 702 (e.g., measured by prediction accuracy) may fail to achieve an acceptable threshold. For example, the large number of model parameters of the reservoir computing neural network 702 may overfit the limited amount of training data.

Rather than training the entire reservoir computing neural network 702 from end-to-end, the training engine 716 only trains the model parameters 714 of the prediction neural network 704 while leaving the model parameters 710 of the brain emulation neural network 204 fixed during training. The model parameters 710 of the brain emulation neural network 204 may be determined before the training of the prediction neural network 704 based on the weight values of the edges in the synaptic connectivity graph, as described above. Optionally, the weight values of the edges in the synaptic connectivity graph may be transformed (e.g., by additive random noise) prior to being used for specifying model parameters 710 of the brain emulation neural network 204. This training procedure enables the reservoir computing neural network 702 to take advantage of the highly complex and non-linear behavior of the brain emulation neural network 204 in performing prediction tasks while obviating the challenges of training the brain emulation neural network 204.

The training engine 716 may train the reservoir computing neural network 702 on a set of training data over multiple training iterations. The training data may include a set of training examples, where each training example specifies: (i) a training network input, and (ii) a target network output that should be generated by the reservoir computing neural network 702 by processing the training network input.

At each training iteration, the training engine 716 may sample a batch of training examples from the training data, and process the training inputs specified by the training examples using the reservoir computing neural network 702 to generate corresponding network outputs 708. In particular, the reservoir computing neural network 702 processes each network input 706 in accordance with the static model parameter values 710 of the brain emulation neural network 204 to generate an alternative representation 712 of the network input 706. The reservoir computing neural network 702 then processes the alternative representation 712 using the current model parameter values 714 of the prediction neural network 704 to generate the network output 708. The training engine 716 adjusts the model parameter values 714 of the prediction neural network 704 to optimize an objective function that measures a similarity between: (i) the network outputs 708 generated by the reservoir computing neural network 702, and (ii) the target network outputs specified by the training examples. The objective function may be, e.g., a cross-entropy objective function, a squared-error objective function, or any other appropriate objective function.

To optimize the objective function, the training engine 716 may determine gradients of the objective function with respect to the model parameters 714 of the prediction neural network 704, e.g., using backpropagation techniques. The training engine 716 may then use the gradients to adjust the model parameter values 714 of the prediction neural network, e.g., using any appropriate gradient descent optimization technique, e.g., an RMSprop or Adam gradient descent optimization technique.

The training engine 716 may use any of a variety of regularization techniques during training of the reservoir computing neural network 702. For example, the training engine 716 may use a dropout regularization technique, such that certain artificial neurons of the brain emulation neural network are "dropped out" (e.g., by having their output set to zero) with a non-zero probability p>0 each time the brain emulation neural network processes a network input. Using the dropout regularization technique may improve the performance of the trained reservoir computing neural network 702, e.g., by reducing the likelihood of over-fitting. An example dropout regularization technique is described with reference to: N. Srivastava, et al.: "Dropout: a simple way to prevent neural networks from over-fitting," Journal of Machine Learning Research 15 (2014) 1929-1958. As another example, the training engine 716 may regularize the training of the reservoir computing neural network 702 by including a "penalty" term in the objective function that measures the magnitude of the model parameter values 714 of the prediction neural network 704. The penalty term may be, e.g., an $L_1$ or $L_2$ norm of the model parameter values 714 of the prediction neural network 704.

In some cases, the values of the intermediate outputs of the brain emulation neural network 204 may have large magnitudes, e.g., as a result from the parameter values of the brain emulation neural network 204 being derived from the weight values of the edges of the synaptic connectivity graph rather than being trained. Therefore, to facilitate training of the reservoir computing neural network 702, batch normalization layers may be included between the layers of the brain emulation neural network 204, which can contribute to limiting the magnitudes of intermediate outputs generated by the brain emulation neural network. Alternatively or in combination, the activation functions of the neurons of the brain emulation neural network may be selected to have a limited range. For example, the activation functions of the neurons of the brain emulation neural network may be selected to be sigmoid activation functions with range given by [0,1].

The reservoir computing neural network 702 may be configured to perform any appropriate task. A few examples follow.

In one example, the reservoir computing neural network 702 may be configured to generate a classification output that classifies the network input into a predefined number of possible categories. For example, the network input may be an image, each category may specify a type of object (e.g., person, vehicle, building, and the like), and the reservoir computing neural network 702 may classify an image into a category if the image depicts an object included in the category. As another example, the network input may be an odor, each category may specify a type of odor (e.g., decomposing or not decomposing), and the reservoir computing neural network 702 may classify an odor into a category if the odor is of the type specified by the category.

In another example, the reservoir computing neural network 702 may be configured to generate an action selection output that can be used to select an action to be performed by an agent interacting with an environment. For example, the action selection output may specify a respective score for each action in a set of possible actions that can be performed by the agent, and the agent may select the action to be performed by sampling an action in accordance with the action scores. In one example, the agent may be a mechanical agent interacting with a real-world environment to perform a navigation task (e.g., reaching a goal location in the environment), and the actions performed by the agent cause the agent to navigate through the environment.

After training, the reservoir computing neural network 702 may be directly applied to perform prediction tasks. However, deployment of the reservoir computing neural network in resource-constrained environments (e.g., mobile devices), or use of the reservoir computing neural network in applications that require minimal latency, may be infeasible due to the complexity of the architecture of the reservoir computing neural network. Therefore, the reservoir computing neural network may be used to train a simpler "student" neural network, e.g., in a similar manner as described with reference to the adversarial training system of FIG. 5 or the distillation training system of FIG. 6.

Figure 8A:
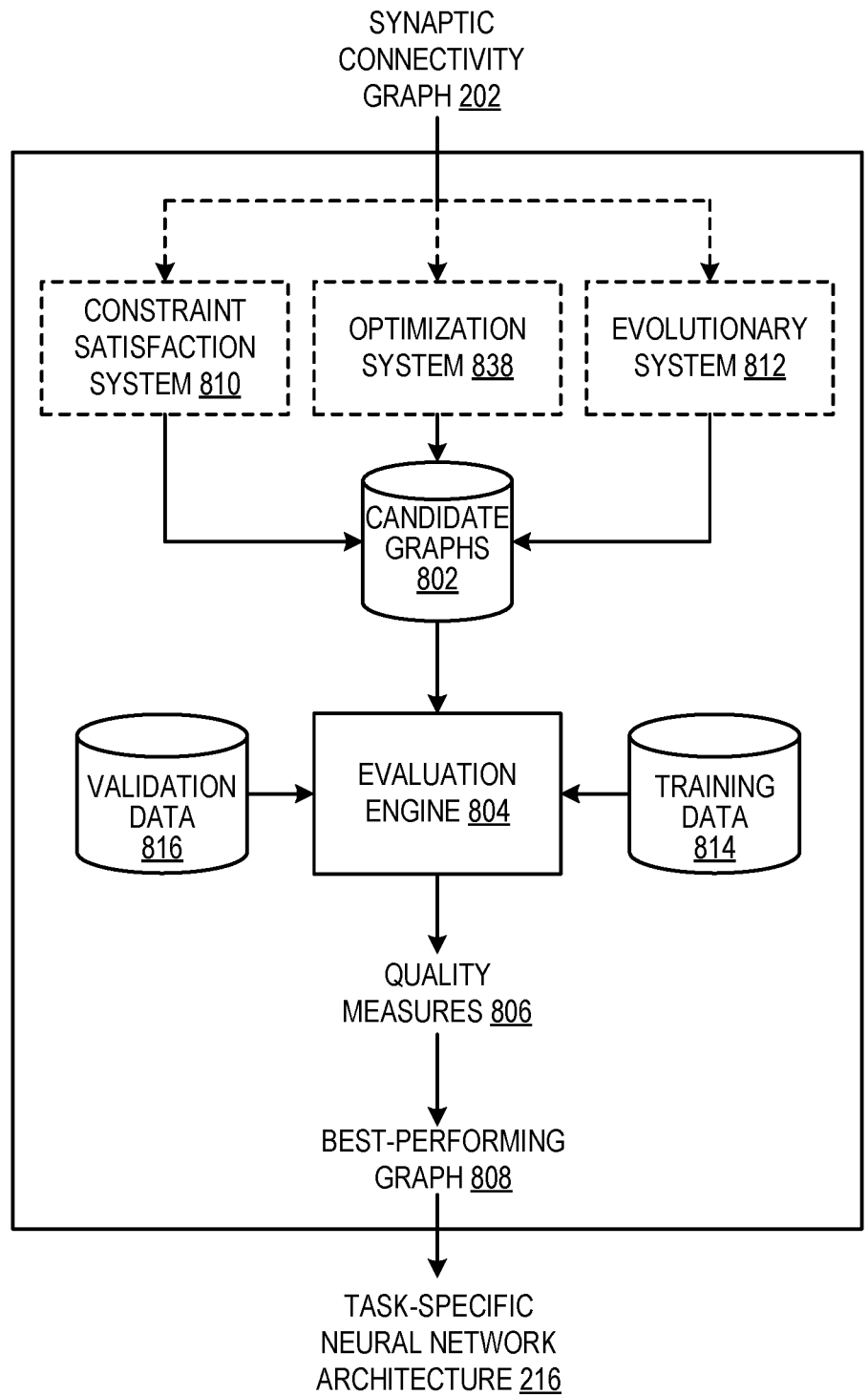
FIG. 8A shows an example architecture search system.

FIG. 8A shows an example architecture search system 800. The architecture search system 800 is an example of a system implemented as computer programs on one or more computers in one or more locations in which the systems, components, and techniques described below are implemented.

The architecture search system 800 is configured to search a space of possible neural network architectures to identify a "task-specific" neural network architecture 216 that can be used to effectively perform a machine learning task. The architecture search system 800 may "seed" (i.e., initialize) the search through the space of possible neural network architectures using a synaptic connectivity graph 202 representing synaptic connectivity in the brain of a biological organism. In particular, the architecture search system 800 may use the synaptic connectivity graph 202 to derive a set of "candidate" graphs 802, each of which can be mapped to a corresponding neural network architecture, e.g., using the architecture mapping system described with reference to FIG. 3. The architecture search system 800 may use an evaluation engine 804 to determine a quality measure 806 for each candidate graph 802 that characterizes the performance of the neural network architecture specified by the candidate graph on the machine learning task. The architecture search system 800 may identify the best-performing graph 808 based on the quality measures 806, and then identify the task-specific neural network architecture 216 as the architecture specified by the best-performing graph 808.

Generally, the performance of a neural network on a machine learning task depends on the architecture of the neural network. The brain of a biological organism may be adapted by evolutionary pressures to be effective at solving certain tasks, and therefore a neural network having an architecture specified by a synaptic connectivity graph corresponding to the brain may inherit the capacity to effectively solve tasks. By seeding the neural architecture search process using the synaptic connectivity graph, the architecture search system 800 may facilitate the discovery of large numbers of biologically-inspired neural network architectures, some of which may be particularly effective at performing certain machine learning tasks.

The synaptic connectivity graph 202 provided to the architecture search system 800 may be derived directly from a synaptic resolution image of the brain of a biological organism, e.g., as described with reference to FIG. 2. In some cases, the synaptic connectivity graph 202 may be a sub-graph of a larger graph derived from a synaptic resolution image of a brain, e.g., a sub-graph that includes neurons of a particular type, e.g., visual neurons, olfactory neurons, or memory neurons. An example process for identifying a sub-graph of a larger synaptic connectivity graph is described with reference to FIG. 3.

The architecture search system 800 may generate the set of candidate graphs 802 from the synaptic connectivity graph 202 using any of a variety of techniques. A few examples follow.

In one example, the architecture search system 800 may use a constraint satisfaction system 810 to generate the set of candidate graphs 802 from the synaptic connectivity graph 202. To generate the candidate graphs 802, the constraint satisfaction system 810 may process the synaptic connectivity graph 202 to determine values of a set of graph features characterizing the synaptic connectivity graph 202. Graph features characterizing a graph may include, e.g., the number of nodes in the graph, the fraction of pairs of nodes in the graph that are connected by edges, and the average path length between pairs of nodes in the graph. The constraint satisfaction system 810 may use the values of the graph features characterizing the synaptic connectivity graph 202 to generate a set of "constraints" on the candidate graphs 802. Each constraint corresponds to a graph feature and specifies a target value or range of target values for the corresponding graph feature of each candidate graph 802.

The constraint satisfaction system 810 may then generate candidate graphs using a procedure defined by the constraints, e.g., such that each candidate graph satisfies at least one of the constraints. An example constraint satisfaction system 810 is described in more detail with reference to FIG. 8B.

In another example, the architecture search system 800 may use an evolutionary system 812 to generate the set of candidate graphs 802 from the synaptic connectivity graph 202. The evolutionary system 812 may generate the candidate graphs 802 by "evolving" a population (i.e., a set) of graphs derived from the synaptic connectivity graph 202 over multiple iterations (referred to herein as "evolutionary" iterations). The evolutionary system 812 may initialize the population of graphs, e.g., by "mutating" multiple copies of the synaptic connectivity graph 202. Mutating a graph refers to making a random change to the graph, e.g., by randomly adding or removing edges or nodes from the graph. After initializing the population of graphs, the evolutionary system 812 may change the population of graphs at each evolutionary iteration, e.g., by removing graphs, adding new graphs, or modifying the existing graphs, based on the performance of the neural network architectures specified by the population of graphs. The evolutionary system 812 may identify the population of graphs after the final evolutionary iteration as the set of candidate graphs 802. An example evolutionary system 812 is described in more detail with reference to FIG. 8C.

In another example, the architecture search system 800 may use an optimization system 838 to generate the set of candidate graphs 802 from the synaptic connectivity graph 202. An example optimization system 838 is described in more detail with reference to FIG. 8D.

The architecture search system 800 uses the evaluation engine 804 to determine a respective quality measure 806 for each candidate graph 802. The evaluation engine 804 may determine the quality measure 806 for a candidate graph 802 based on a performance measure on a machine learning task of a neural network having the neural network architecture specified by the candidate graph 802. The architecture mapping system 300 may map each candidate graph 802 to a corresponding neural network architecture, e.g., using the architecture mapping system described with reference to FIG. 3. The machine learning task may be, e.g., a classification task, a regression task, or any other appropriate task.

The evaluation engine 804 may measure the performance of a neural network on a machine learning task, e.g., by training the neural network on a set of training data 814, and then evaluating the performance of the trained neural network on a set of validation data 816. Both the training data 814 and the validation data 816 may include training examples, where each training example specifies: (i) a training input, and (ii) a target output that should be generated by processing the training input. In determining the performance measure of a neural network, the evaluation engine 804 trains the neural network on the training data 814, but reserves the validation data 816 for evaluating the performance of the trained neural network (i.e., by not training the neural network on the validation data 816). The evaluation engine 804 may evaluate the performance of the trained neural network on the validation data 816, e.g., by using an objective function to measure a similarity between: (i) the target outputs specified by the validation data, and (ii) the outputs generated by the trained neural network. The objective function may be, e.g., a cross-entropy objective function (in the case of a classification task) or a squared-error objective function (in the case of a regression task).

In some cases, the evaluation engine 804 may determine the quality measure 806 for a candidate graph 802 by indirectly measuring the performance of the neural network architecture specified by the candidate graph on the machine learning task. For example, to determine the quality measure 806 for a candidate graph 802, the evaluation engine 804 may instantiate a corresponding reservoir computing neural network as described with reference to FIG. 7. In particular, the reservoir computing neural network may include: (i) a "reservoir" sub-network having an architecture specified by the candidate graph to process the input to the reservoir computing neural network to generate the alternative representation of the input, and (ii) a prediction neural network to process the alternative representation. The evaluation engine 804 may train the reservoir computing neural network on the training data 814, i.e., by training the parameter values of the prediction neural network while leaving the parameter values of the reservoir sub-network fixed, as described with reference to FIG. 7. The evaluation engine 804 may then determine the quality measure 806 for the candidate graph 802 based on a performance measure of the trained reservoir computing neural network evaluated on the validation data 816. Determining the quality measures 806 for the candidate graphs 802 in this manner may less computationally intensive than directly training neural networks having architectures specified by the candidate graphs 802 on the training data 814.

In determining the quality measure 806 for a candidate graph 802, the evaluation engine 804 may take other factors into consideration in addition to the performance measure of the neural network architecture specified by the candidate graph 802 on the machine learning task. For example, the evaluation engine 804 may further determine the quality measure 806 for a candidate graph 802 based on the computational resource consumption of a neural network having the neural network architecture specified by the candidate graph. The computational resource consumption corresponding to a neural network architecture may be determined based on, e.g.: (i) the memory required to store data specifying the architecture, and (ii) the number of arithmetic operations performed by a neural network having the architecture to generate a network output. In one example, the evaluation engine 804 may determine the quality measure 806 of each candidate graph as a linear combination of: (i) a performance measure of the neural network architecture on the machine learning task, and (ii) a measure of the computational resource consumption induced by the neural network architecture.

The architecture search system 800 may identify a best-performing graph 808 based on the quality measures 806. For example, the architecture search system 800 may identify the best-performing graph 808 as the candidate graph 802 with the highest quality measure 806.

After identifying the best-performing graph 808 from the set of candidate graphs 802, the architecture search system 800 may provide the neural network architecture 216 specified by the best-performing graph 808 for use in performing the machine learning task.

Figure 8B:
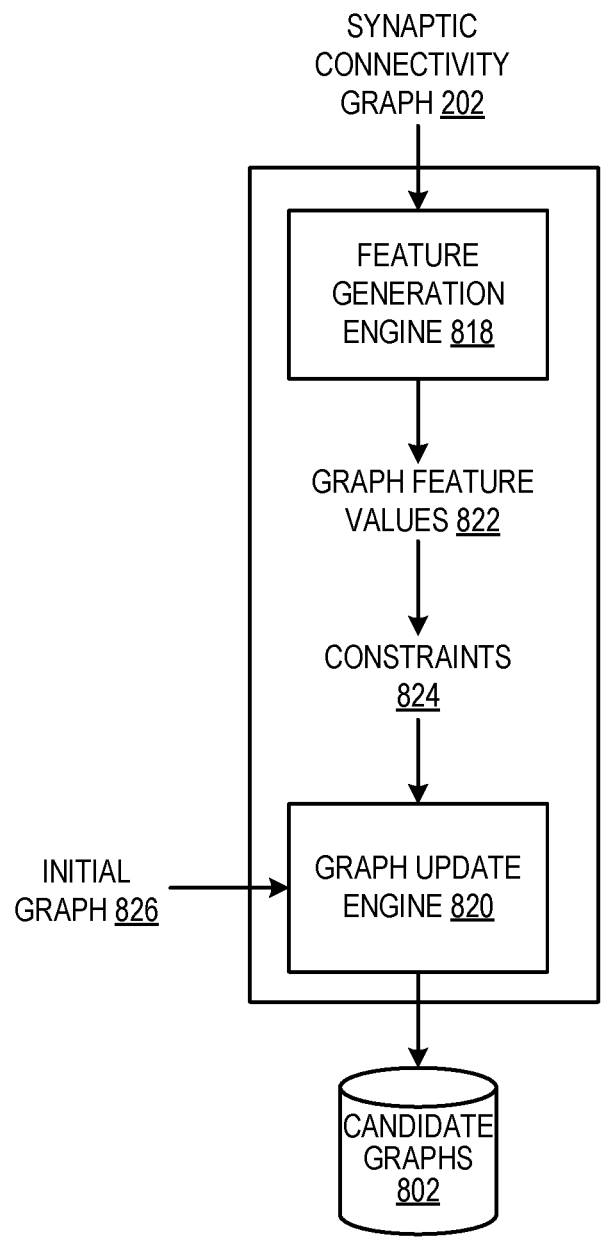
FIG. 8B shows an example constraint satisfaction system.

FIG. 8B shows an example constraint satisfaction system 810. The constraint satisfaction system 810 is an example of a system implemented as computer programs on one or more computers in one or more locations in which the systems, components, and techniques described below are implemented.

The constraint satisfaction system 810 is configured to generate a set of candidate graphs 802 based on "constraints" derived from the values of graph features characterizing the synaptic connectivity graph 202. The candidate graphs 802 generated by the constraint satisfaction system 810 each specify a neural network architecture that may be provided to the architecture search system described with reference to FIG. 8A.

The constraint satisfaction system 810 generates the candidate graphs 802 from the synaptic connectivity graph 202 using a feature generation engine 818 and a graph update engine 820, each of which will be described in more detail next.

The feature generation engine 818 is configured to process the synaptic connectivity graph 202 to determine the values of one or more graph features 822 of the synaptic connectivity graph 202, e.g., that characterize various aspects of the structure of the synaptic connectivity graph 202. A few examples of graph features follow.

In one example, the feature generation engine 818 may determine a graph feature value 822 that specifies the number of nodes in the synaptic connectivity graph 202.

In another example, the feature generation engine 818 may determine a graph feature value 822 that specifies the number of edges in the largest cluster in a two-dimensional array representing the synaptic connectivity graph 202. A cluster in a two-dimensional array representing a graph may refer to a contiguous region of the array such that at least a threshold fraction of the components in the region have a value indicating that an edge exists between the pair of nodes corresponding to the component, as described with reference to FIG. 3.

In another example, the feature generation engine 818 may determine a graph feature value 822 that specifies the number of clusters in the two-dimensional array representing the synaptic connectivity graph 202 that include a number of edges that is within a predefined range of values, e.g., the range [5,10].

In another example, the feature generation engine 818 may determine graph feature values 822 that specify, for each of multiple predefined ranges of values, the number of clusters in the two-dimensional array representing the synaptic connectivity graph that include a number of edges that is within the range of values. The predefined ranges of values may be, e.g.: {[1,10], [10,100], [100, ∞)}.

In another example, the feature generation engine 818 may determine a graph feature value 822 that specifies the average path length between nodes in the synaptic connectivity graph 202.

In another example, the feature generation engine 818 may determine a graph feature value 822 that specifies the maximum path length between nodes in the synaptic connectivity graph 202.

In another example, the feature generation engine 818 may determine a graph feature value 822 that specifies the fraction of node pairs in the synaptic connectivity graph 202 (i.e., where a node pair specifies a first node and a second node in the synaptic connectivity graph 202) that are connected by an edge.

In another example, the feature generation engine 818 may determine a graph feature value 822 that specifies the fraction of nodes in the synaptic connectivity graph 202 having the property that the synaptic connectivity graph 202 includes an edge that connects the node to itself.

The constraint satisfaction system 810 determines one or more constraints 824 from the graph features values 822 characterizing the synaptic connectivity graph 202. Each constraint corresponds to a respective graph feature and specifies a target value or a range of target values of the graph feature for the candidate graphs 802. A few examples of determining constraints from the graph feature values 822 characterizing the synaptic connectivity graph 202 are described next.

In one example, the constraint satisfaction system 810 may determine a constraint specifying a target value for a graph feature for the candidate graphs 802 that matches the value of the graph feature for the synaptic connectivity graph 202. For example, if the value of the graph feature specifying the number of nodes in the synaptic connectivity graph 202 is n, then the constraint satisfaction system 810 may determine the target value of the graph feature specifying the number of nodes in each candidate graph 802 to be n.

As another example, the constraint satisfaction system 810 may determine a constraint specifying a range of target values for a graph feature for the candidate graphs 802, where the range of target values includes the value of the graph feature for the synaptic connectivity graph 202. In one example, the value of the graph feature specifying the fraction of node pairs in the synaptic connectivity graph 202 that are connected by an edge may be $p \in (0,1)$. In this example, the constraint satisfaction system 810 may determine the target range of values of the graph feature specifying the fraction of node pairs in each candidate graph 802 that are connected by an edge to be $[p-\epsilon, p+\epsilon] \cap [0,1]$, where $\epsilon > 0$.

The graph update engine 820 uses the constraints 824 to guide a procedure for randomly generating candidate graphs 802, e.g., to cause each of the candidate graphs 802 to satisfy at least one of the constraints 824. For example, the graph update engine 820 may generate a candidate graph 802 by iteratively updating an "initial" graph 826, e.g., by adding or removing nodes or edges from the initial graph 826 at each of one or more iterations. The initial graph 826 may be, e.g., a default (predefined) graph, or a randomly generated graph. At each iteration, the graph update engine 820 may update the current graph to cause the current graph to satisfy a corresponding constraint 824. For example, the constraints 824 may be associated with a predefined linear ordering $\{C_i\}_{i=0}^{N-1}$ (i.e., where each $C_i$ denotes a constraint), and at the j-th iteration, the graph update engine 820 may update the current graph to cause it to satisfy constraint $C_{(j \bmod N)}$. Put another way: at the first iteration, the graph update engine 820 may update the initial graph to cause it to satisfy the first constraint; at the second iteration, the graph update engine 820 may update the current graph to cause it to satisfy the second constraint; and so on. After updating the current graph to cause it to satisfy the final constraint, the graph update engine 820 may loop back to the first constraint. After a final iteration (e.g., of a predefined number of iterations), the graph update engine 820 may output the current graph as a candidate graph 802.

At any given iteration, the graph update engine 820 may update the current graph to satisfy a corresponding constraint 824 using a procedure that involves some randomness. In one example, the graph update engine 820 may update the current graph to satisfy a constraint specifying that the fraction of node pairs in the graph that are connected by an edge be $p \in (0,1)$. In this example, the graph update engine 820 may randomly add or remove edges from the current graph until the constraint is satisfied. In another example, the graph update engine 820 may update the current graph to satisfy a constraint specifying that the graph include N clusters that each have a number of edges that is included in the interval [A, B]. For convenience, this example will assume that the current graph is a default graph that does not yet include any edges. The graph update engine 820 may randomly select N locations in a representation of the graph as a two-dimensional array having value 0 in each component, e.g., by sampling N locations from a uniform distribution over the array. For each of the N sampled locations in the array, the graph update engine 820 may identify a contiguous region around the location that includes a number of components in the range [A, B], and then set each component in the contiguous region to have value 1 (i.e., indicating an edge).

In some cases, a candidate graph 802 generated by the graph update engine 820 may not satisfy all of the constraints. In particular, at one or more iterations during generation of the candidate graph, updating the current graph to cause it to satisfy a corresponding constraint 824 may have resulted in the updated graph violating one or more other constraints.

Figure 8C:
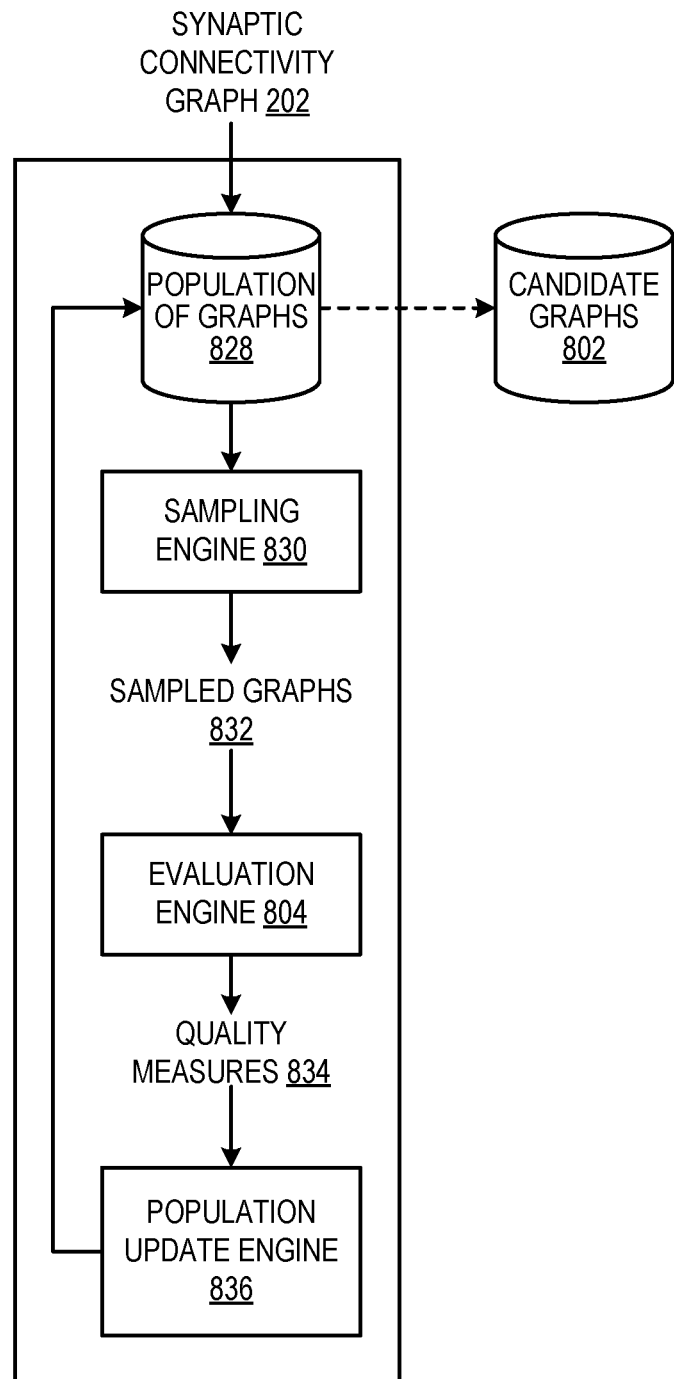
FIG. 8C shows an example evolutionary system.

FIG. 8C shows an example evolutionary system 812. The evolutionary system 812 is an example of a system implemented as computer programs on one or more computers in one or more locations in which the systems, components, and techniques described below are implemented.

The evolutionary system 812 is configured to generate a set of candidate graphs 802 from the synaptic connectivity graph 202 by evolving a population (i.e., set) of graphs 828 derived from the synaptic connectivity graph 202 over multiple evolutionary iterations. The candidate graphs 802 generated by the evolutionary system 812 each specify a neural network architecture that may be provided to the architecture search system described with reference to FIG. 8A.

At each evolutionary iteration, the evolutionary system 812 may adapt the population of graphs 828 by removing one or more graphs from the population 828, adding one or more graphs to the population 828, or changing one or more graphs in the population 828. As will be described in more detail below, the changes applied to the population of graphs at each iteration include an element of randomness and are intended to increase the quality measures of the graphs in the population 828. After a final evolutionary iteration, the evolutionary system 812 may provide the current population of graphs 828 as the set of candidate graphs 802.

Prior to the first evolutionary iteration, the evolutionary system 812 may initialize the population 828 based on the synaptic connectivity graph 202. For example, to initialize the population 828, the evolutionary system 812 may generate multiple copies of the synaptic connectivity graph 202, and "mutate" (i.e., modify) each copy of the synaptic connectivity graph 202 to generate a mutated graph which is then added to the initial population 828. The evolutionary system 812 may mutate a graph by applying one or more random modifications to the graph. The random modifications may include, e.g., adding or removing edges between randomly selected pairs of nodes in the graph, or adding random "noise" values (e.g., sampled from a predefined probability distribution) to the weight values associated with the edges of the graph.

At each evolutionary iteration, the sampling engine 830 may select (e.g., randomly sample) a set of current graphs 832 from the population of graphs 828. The evolutionary system 812 may use an evaluation engine 804 (e.g., as described with reference to FIG. 8A) to determine a respective quality measure 834 corresponding to each of the sampled graphs 832. The quality measure for a graph may be based on a performance measure on a machine learning task of a neural network having the neural network architecture specified by the graph.

The population update engine 836 determines how the population of graphs 828 should be updated at the current evolutionary iteration based on the quality measures 34 of the sampled graphs 832. For example, the population update engine 836 may remove any sampled graphs 832 having quality measures 34 that are below a threshold value. As another example, for sampled graphs 832 having quality measures that are above a threshold value, the population update engine 836 may: (i) maintain the sampled graphs 832 in the population 828, and (ii) add randomly mutated (i.e., modified) copies of the sampled graphs 832 to the population 828.

Iteratively adapting the population of graphs 828 in this manner simulates an evolutionary process by which graphs having desirable traits (e.g., that result in higher quality measures) are propagated and mutated in the population, and graphs having undesirable traits (i.e., that result in low quality measures) are removed from the population. Initializing the population of graphs 828 using the synaptic connectivity graph 202 may facilitate the evolution of biologically-inspired graphs specifying neural network architectures are effective at performing machine learning tasks.

Figure 8D:
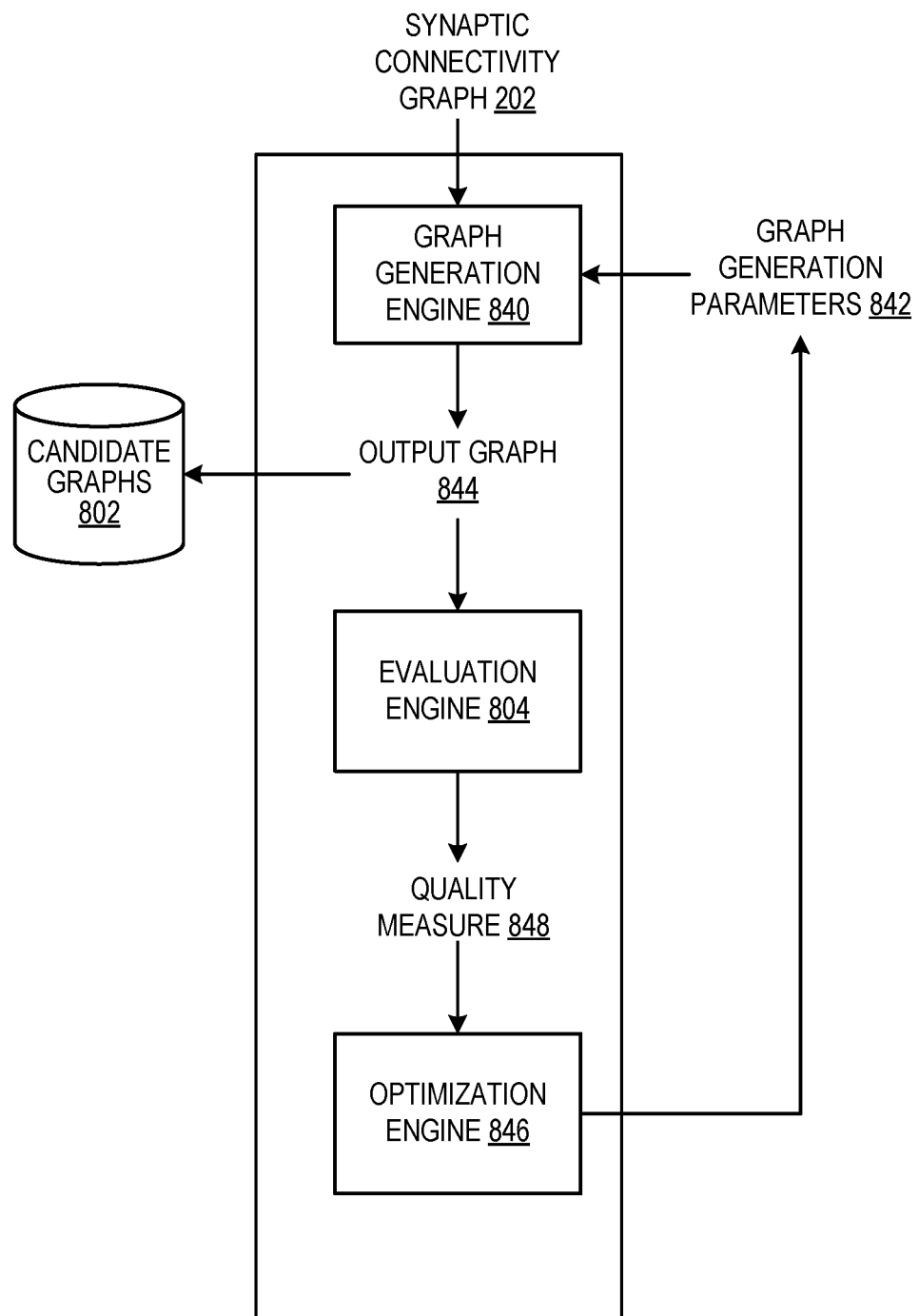
FIG. 8D shows an example optimization system.

FIG. 8D shows an example optimization system 838. The optimization system 838 is an example of a system implemented as computer programs on one or more computers in one or more locations in which the systems, components, and techniques described below are implemented.

The optimization system 838 generates candidate graphs 802 using a graph generation engine 840. The graph generation engine 840 is configured to process the synaptic connectivity graph 202 in accordance with a set of graph generation parameters 842 to generate an output graph 844 that is added to the set of candidate graphs 802. The optimization system 838 iteratively optimizes the parameters 842 of the graph generation engine 840 using an optimization engine 846 to increase the quality measures 848 of the output graphs 844 generated by the graph generation engine 840, as will be described in more detail below.

The parameters 842 of the graph generation engine 840 specify transformation operations that are applied to the synaptic connectivity graph 202 to generate an output graph 844. The graph generation engine 840 may generate the output graph 844 by applying transformation operations to a representation of the synaptic connectivity graph 202 as a two-dimensional array of numerical values. As described above, a graph may be represented as a two-dimensional array of numerical values with a number of rows and columns equal to the number of nodes in the graph. The component of the array at position (i,j) may have value 1 if the graph includes an edge pointing from node i to node j, and value 0 otherwise. In one example, as part of generating an output graph 844, the graph generation engine 840 may apply a convolutional filtering operation specified by a filtering kernel to the array representing the synaptic connectivity graph 202. In this example, the graph generation parameters 842 may specify the components of a matrix defining the filtering kernel. In another example, as part of generating an output graph 844, the graph generation engine 840 may apply a "shifting" operation to the array representing the synaptic connectivity graph 202, e.g., such that each the value in each component of the array is translated "left", "right", "up", or "down". Components that are shifted outside the bounds of the array may be wrapped around the opposite side of the array. In this example, the graph generation parameters 842 may specify the direction and magnitude of the shifting operation. In another example, as part of generating an output graph 844, the graph generation engine 840 may remove one or more nodes from the synaptic connectivity graph, e.g., such that the output graph is a sub-graph of the synaptic connectivity graph. In this example, the graph generation parameters 842 may specify the nodes to be removed from the synaptic connectivity graph 202 (e.g., the graph generation parameters 842 may specify the indices of the nodes to be removed from the synaptic connectivity graph 202).

At each of multiple iterations, the graph generation engine 840 processes the synaptic connectivity graph 202 in accordance with the current values of the graph generation parameters 842 to generate an output graph 844 which may then be added to the set of candidate graphs 802. The optimization system 838 determines a quality measure 848 of the output graph 844 using an evaluation engine 804 (e.g., as described with reference to FIG. 8A), and then provides the quality measure 848 of the output graph 844 to the optimization engine 846.

The optimization engine 846 is configured to process the quality measures 848 of the output graphs 844 to determine adjustments to the current values of the graph generation parameters to encourage the generation of output graphs with higher quality measures. Prior to the first iteration, the values of the graph generation parameters 842 may be set to default values or randomly initialized. The optimization engine 846 may use any appropriate optimization technique, e.g., a "black-box" optimization technique that does not rely on computing gradients of the transformation operations applied by the graph generation engine 840. Examples of black-box optimization techniques which may be implemented by the optimization engine 846 are described with reference to: Golovin, D., Solnik, B., Moitra, S., Kochanski, G., Karro, J., & Sculley, D.: "Google vizier: A service for black-box optimization," In Proceedings of the 23rd ACM SIGKDD International Conference on Knowledge Discovery and Data Mining, pp. 1487-1495 (2017).

After the final iteration, the optimization system 838 may provide the candidate graphs 802 for use by the architecture search system 800 described with reference to FIG. 8A.

Figure 9:
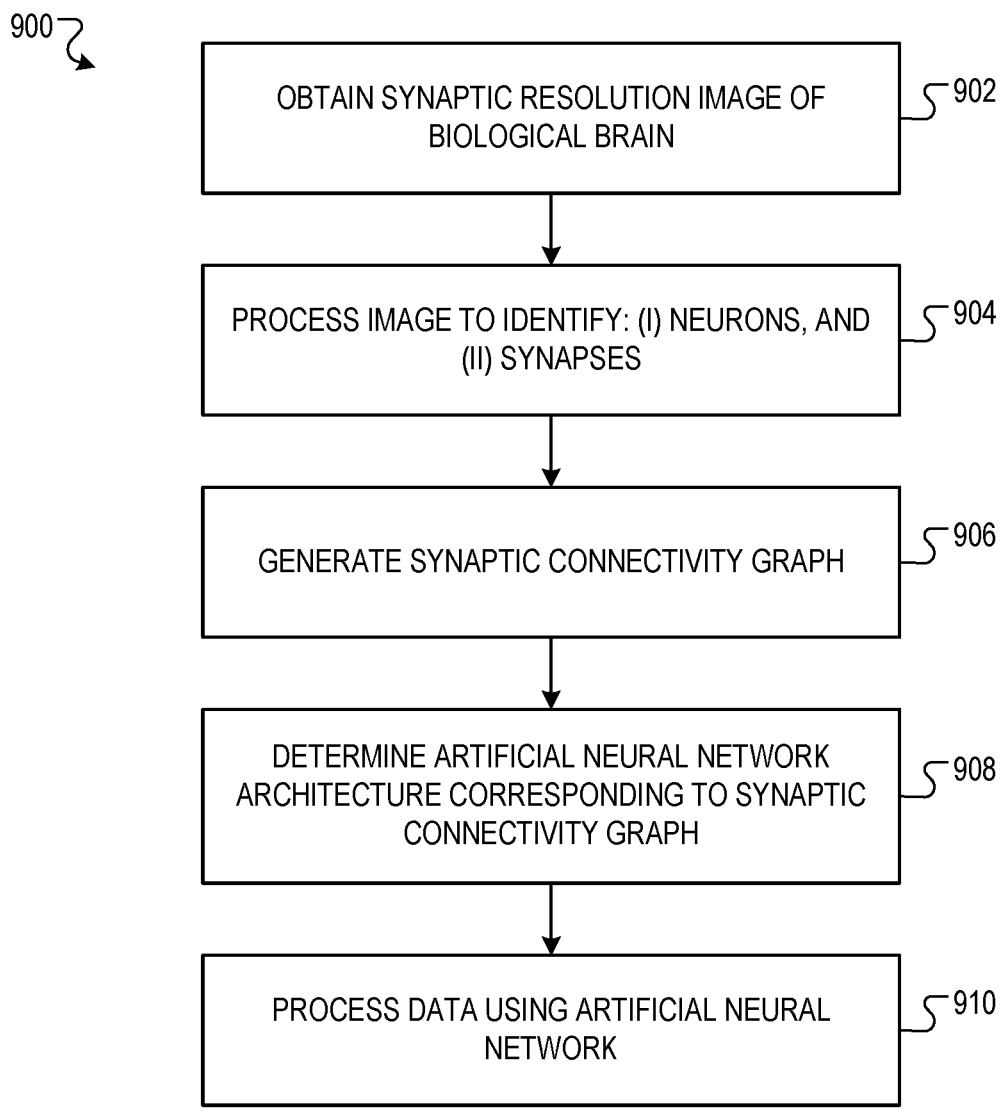
FIG. 9 is a flow diagram of an example process for generating a brain emulation neural network.

FIG. 9 is a flow diagram of an example process 900 for generating a brain emulation neural network. For convenience, the process 900 will be described as being performed by a system of one or more computers located in one or more locations.

The system obtains a synaptic resolution image of at least a portion of a brain of a biological organism (902).

The system processes the image to identify: (i) neurons in the brain, and (ii) synaptic connections between the neurons in the brain (904).

The system generates data defining a graph representing synaptic connectivity between the neurons in the brain (906). The graph includes a set of nodes and a set of edges, where each edge connects a pair of nodes. The system identifies each neuron in the brain as a respective node in the graph, and each synaptic connection between a pair of neurons in the brain as an edge between a corresponding pair of nodes in the graph.

The system determines an artificial neural network architecture corresponding to the graph representing the synaptic connectivity between the neurons in the brain (908).

The system processes a network input using an artificial neural network having the artificial neural network architecture to generate a network output (910).

Figure 10:
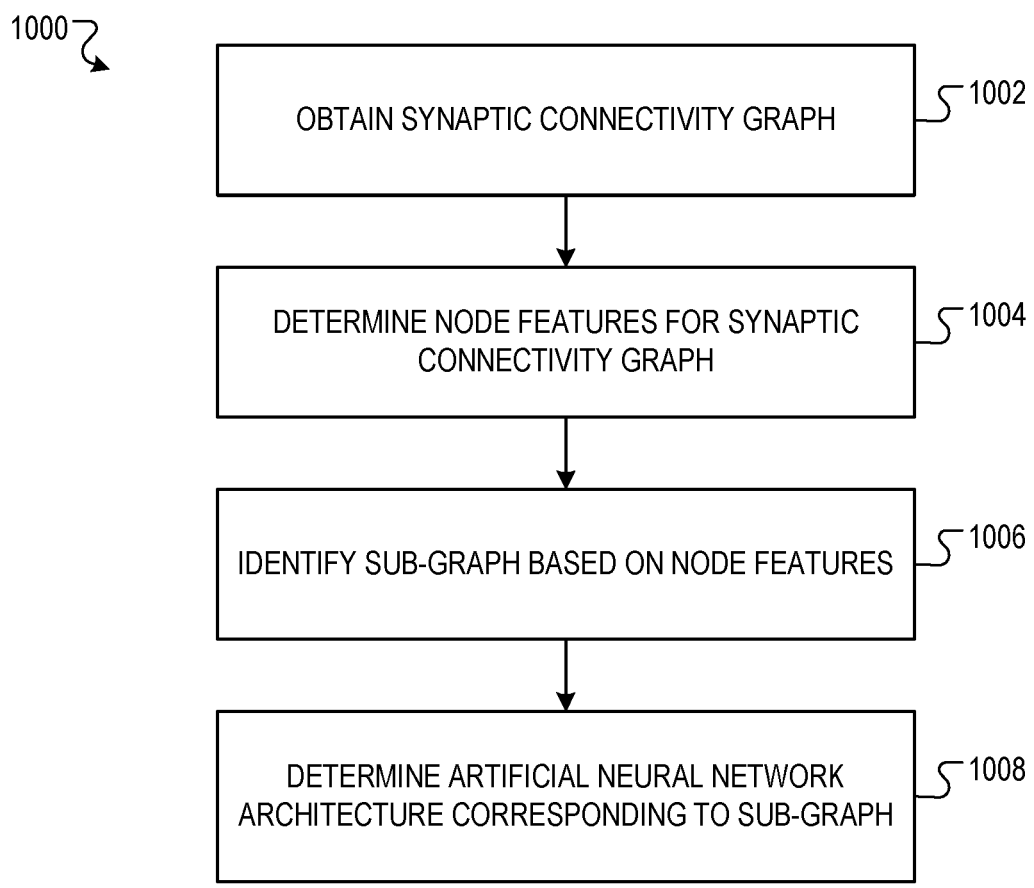
FIG. 10 is a flow diagram of an example process for determining an artificial neural network architecture corresponding to a sub-graph of a synaptic connectivity graph.

FIG. 10 is a flow diagram of an example process 1000 for determining an artificial neural network architecture corresponding to a sub-graph of a synaptic connectivity graph. For convenience, the process 1000 will be described as being performed by a system of one or more computers located in one or more locations. For example, an architecture mapping system, e.g., the architecture mapping system 300 of FIG. 3, appropriately programmed in accordance with this specification, can perform the process 1000.

The system obtains data defining a graph representing synaptic connectivity between neurons in a brain of a biological organism (1002). The graph includes a set of nodes and edges, where each edge connects a pair of nodes. Each node corresponds to a respective neuron in the brain of the biological organism, and each edge connecting a pair of nodes in the graph corresponds to a synaptic connection between a pair of neurons in the brain of the biological organism.

The system determines, for each node in the graph, a respective set of one or more node features characterizing a structure of the graph relative to the node (1004).

The system identifies a sub-graph of the graph (1006). In particular, the system selects a proper subset of the nodes in the graph for inclusion in the sub-graph based on the node features of the nodes in the graph.

The system determines an artificial neural network architecture corresponding to the sub-graph of the graph (1008).

Figure 11:
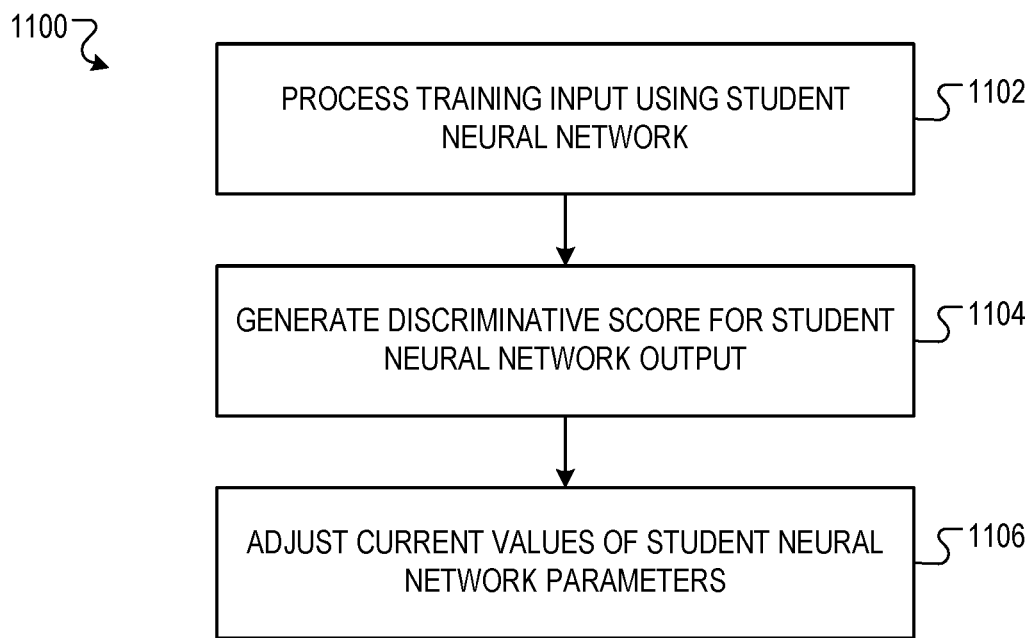
FIG. 11 is a flow diagram of an example process for adversarial training of a student neural network using a brain emulation neural network.

FIG. 11 is a flow diagram of an example process 1100 for adversarial training of a student neural network using a brain emulation neural network. For convenience, the process 1100 will be described as being performed by a system of one or more computers located in one or more locations. For example, an adversarial training system, e.g., the adversarial training system 500 of FIG. 5, appropriately programmed in accordance with this specification, can perform the process 1100.

The system processes a training input using the student neural network to generate an output for the training input (1102).

The system processes the student neural network output using a discriminative neural network to generate a discriminative score for the student neural network output (1104). The discriminative neural network is trained to process a network input to generate a discriminative score that characterizes a prediction for whether the network input was generated using: (i) the student neural network, or (ii) a brain emulation neural network. The brain emulation neural network has a neural network architecture that is specified by a graph representing synaptic connectivity between neurons in a brain of a biological organism. The graph has a set of nodes and a set of edges, where each edge connects a pair of nodes. Each node corresponds to a respective neuron in the brain of the biological organism, and each edge connecting a pair of nodes in the graph corresponds to a synaptic connection between a pair of neurons in the brain of the biological organism.

The system adjusts current values of the student neural network parameters using gradients of an objective function that depends on the discriminative score for the student neural network output (1106). Adjusting the current values of the student neural network parameters using gradients of an objective function encourages the student neural network to generate outputs that are more likely to be misclassified by the discriminative neural network as having been generated by the brain emulation neural network.

Figure 12:
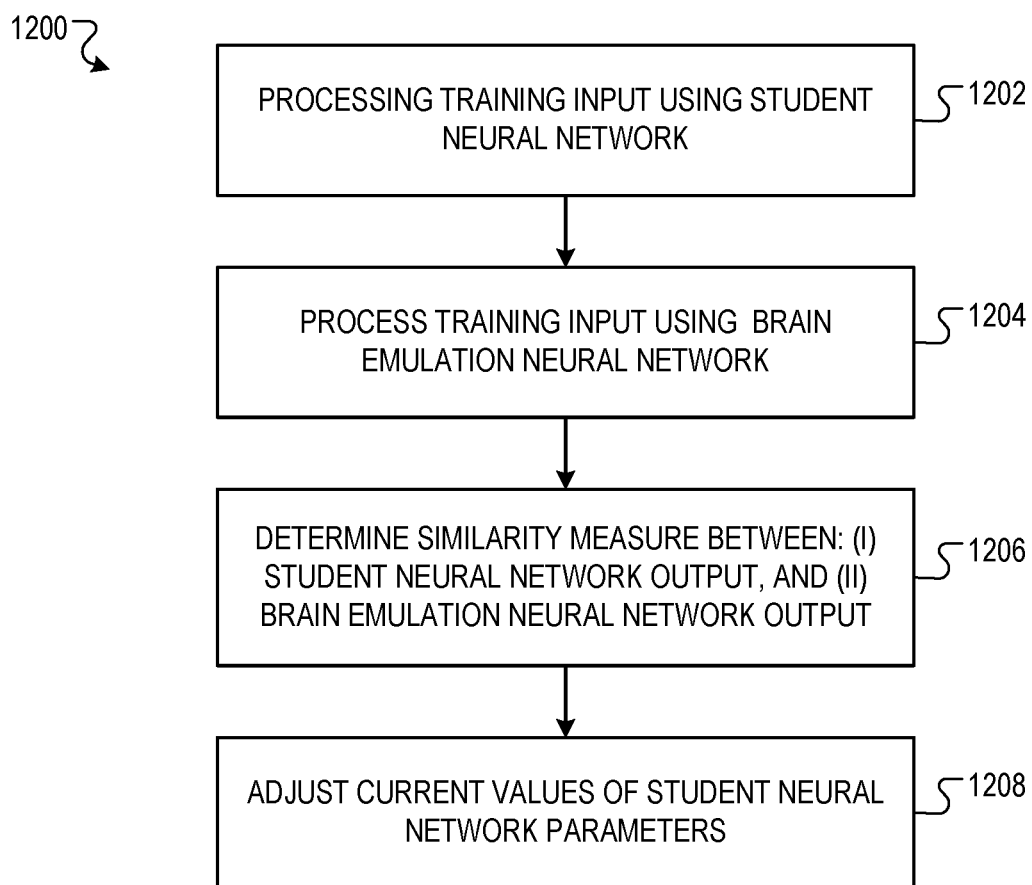
FIG. 12 is a flow diagram of an example process for distillation training of a student neural network using a brain emulation neural network.

FIG. 12 is a flow diagram of an example process 1200 for distillation training of a student neural network using a brain emulation neural network. For convenience, the process 1200 will be described as being performed by a system of one or more computers located in one or more locations. For example, a distillation training system, e.g., the distillation training system 600 of FIG. 6, appropriately programmed in accordance with this specification, can perform the process 1200.

The system processes a training input using the student neural network to generate a student neural network output that includes a respective score for each of multiple classes (1202).

The system processes the training input using a brain emulation neural network to generate a brain emulation neural network output that includes a respective score for each of multiple classes (1204). The brain emulation neural network has a neural network architecture that is specified by a graph representing synaptic connectivity between neurons in a brain of a biological organism. The graph has a set of nodes and a set of edges, where each edge connects a pair of nodes. Each node corresponds to a respective neuron in the brain of the biological organism, and each edge connecting a pair of nodes in the graph corresponds to a synaptic connection between a pair of neurons in the brain of the biological organism.

The system determines a similarity measure between: (i) the student neural network output for the training input, and (ii) the brain emulation neural network output for the training input (1206).

The system adjusts the current values of the student neural network parameters using gradients of an objective function that depends on the similarity measure between: (i) the student neural network output for the training input, and (ii) the brain emulation neural network output for the training input (1208).

Figure 13:
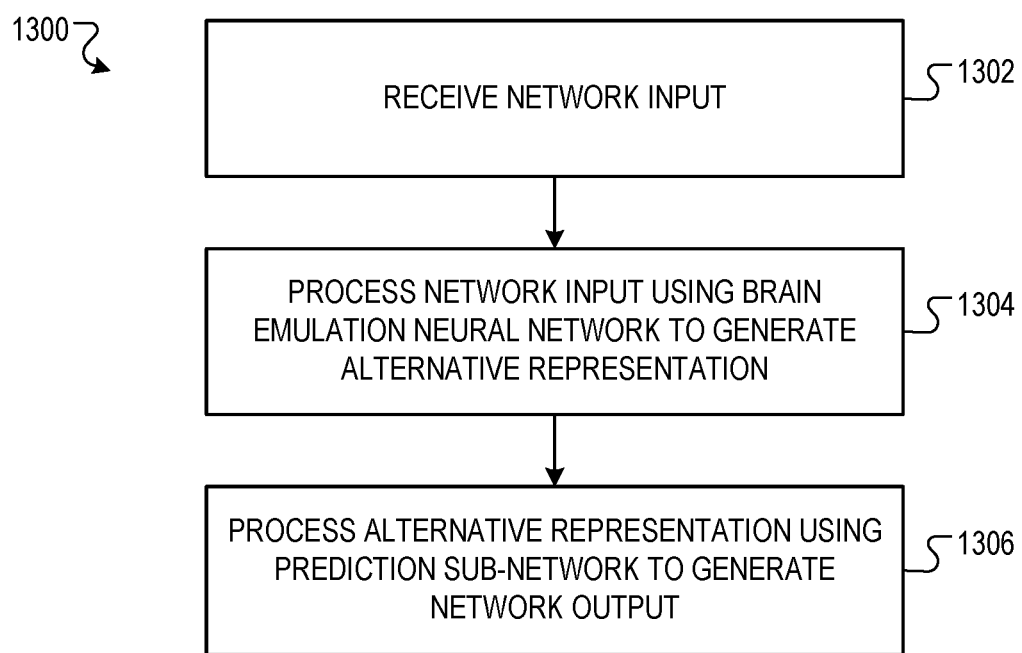
FIG. 13 is a flow diagram of an example process for processing data using a reservoir computing neural network that includes: (i) a brain emulation sub-network, and (ii) a prediction sub-network.

FIG. 13 is a flow diagram of an example process 1300 for processing data using a reservoir computing neural network that includes: (i) a brain emulation sub-network, and (ii) a prediction sub-network. For convenience, the process 1300 will be described as being performed by a system of one or more computers located in one or more locations. For example, a reservoir computing system, e.g., the reservoir computing system 700 of FIG. 7, appropriately programmed in accordance with this specification, can perform the process 1300.

The system receives a network input to the processed by the reservoir computing neural network (1302).

The system processes the network input using the brain emulation sub-network to generate an alternative representation of the network input (1304). The system determines the values of the brain emulation sub-network parameters before the reservoir computing neural network is trained and holds them fixed them during training of the reservoir computing neural network. The brain emulation sub-network has a neural network architecture that is specified by a graph representing synaptic connectivity between neurons in a brain of a biological organism. The graph has a set of nodes and a set of edges, where each edge connects a pair of nodes. Each node corresponds to a respective neuron in the brain of the biological organism, and each edge connecting a pair of nodes in the graph corresponds to a synaptic connection between a pair of neurons in the brain of the biological organism.

The system processes the alternative representation of the network input using the prediction sub-network to generate the network output (i.e., of the reservoir computing neural network) (1306). The system adjusts the values of the prediction sub-network parameters during training of the reservoir computing neural network.

Figure 14:
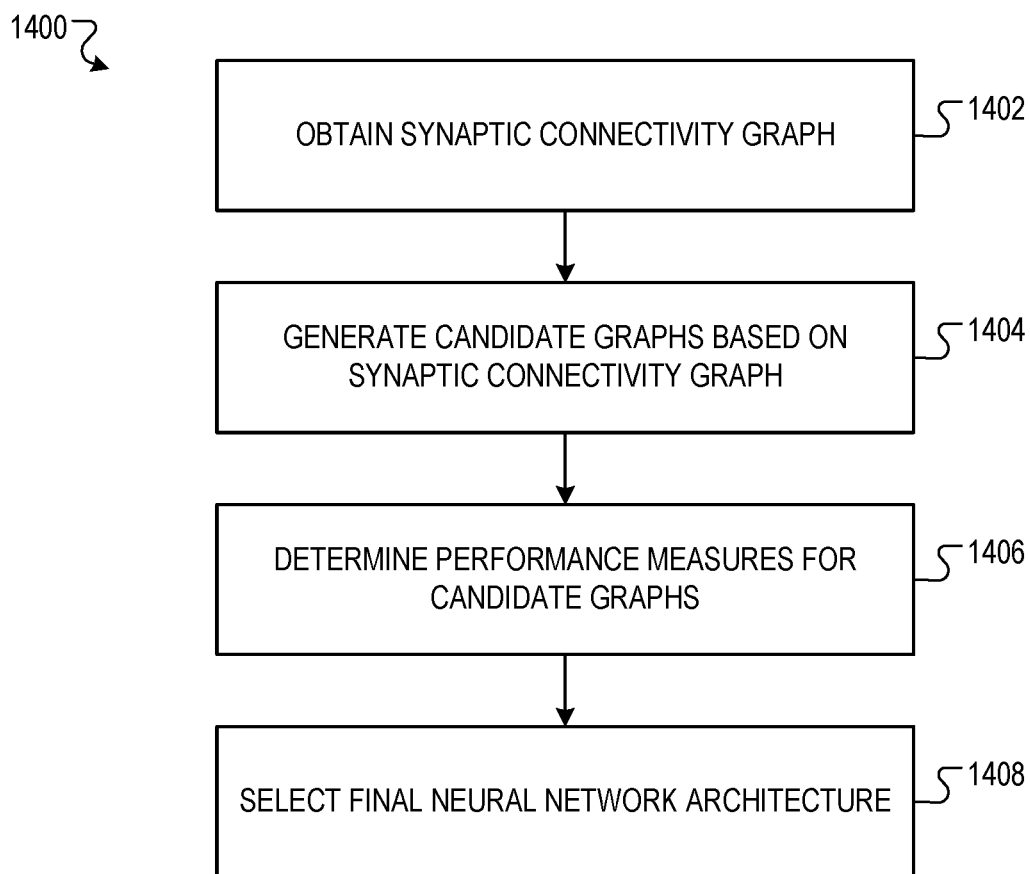
FIG. 14 is a flow diagram of an example process for seeding a neural architecture search procedure using a synaptic connectivity graph.

FIG. 14 is a flow diagram of an example process for seeding a neural architecture search procedure using a synaptic connectivity graph. For convenience, the process 1400 will be described as being performed by a system of one or more computers located in one or more locations. For example, an architecture search system, e.g., the architecture search system 800 of FIG. 8A, appropriately programmed in accordance with this specification, can perform the process 1400.

The system obtains data defining a synaptic connectivity graph representing synaptic connectivity between neurons in a brain of a biological organism (1402). The synaptic connectivity graph has a set of nodes and edges, where each edge connects a pair of nodes, each node corresponds to a respective neuron in the brain of the biological organism. Each edge connecting a pair of nodes in the synaptic connectivity graph corresponds to a synaptic connection between a pair of neurons in the brain of the biological organism.

The system generates data defining a set of candidate graphs based on the synaptic connectivity graph (1404).

The system determines, for each candidate graph, a performance measure on a machine learning task of a neural network having a neural network architecture that is specified by the candidate graph (1406).

The system selects a final neural network architecture for performing the machine learning task based on the performance measures (1408).

Figure 15:
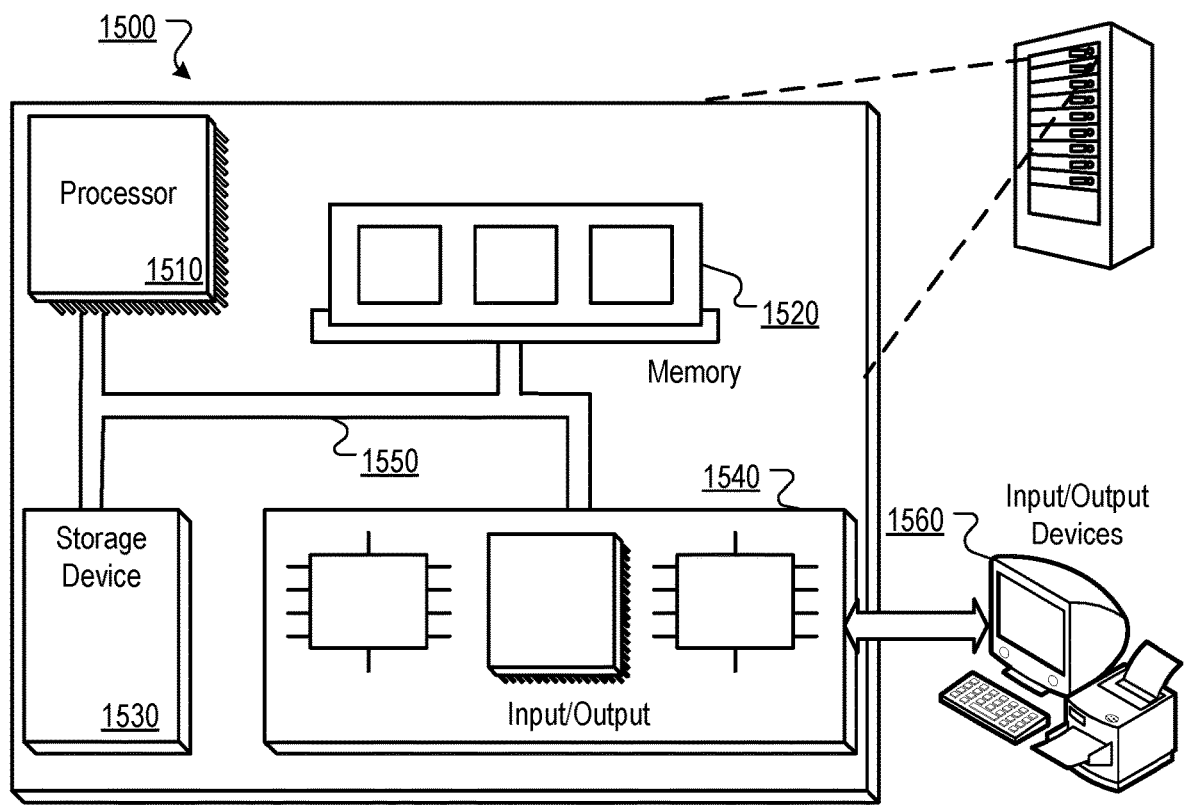
FIG. 15 is a block diagram of an example computer system.

FIG. 15 is a block diagram of an example computer system 1500 that can be used to perform operations described previously. The system 1500 includes a processor 1510, a memory 1520, a storage device 1530, and an input/output device 1540. Each of the components 1510, 1520, 1530, and 1540 can be interconnected, for example, using a system bus 1550. The processor 1510 is capable of processing instructions for execution within the system 1500. In one implementation, the processor 1510 is a single-threaded processor. In another implementation, the processor 1510 is a multi-threaded processor. The processor 1510 is capable of processing instructions stored in the memory 1520 or on the storage device 1530.

The memory 1520 stores information within the system 1500. In one implementation, the memory 1520 is a computer-readable medium. In one implementation, the memory 1520 is a volatile memory unit. In another implementation, the memory 1520 is a non-volatile memory unit.

The storage device 1530 is capable of providing mass storage for the system 1500. In one implementation, the storage device 1530 is a computer-readable medium. In various different implementations, the storage device 1530 can include, for example, a hard disk device, an optical disk device, a storage device that is shared over a network by multiple computing devices (for example, a cloud storage device), or some other large capacity storage device.

The input/output device 1540 provides input/output operations for the system 1500. In one implementation, the input/output device 1540 can include one or more network interface devices, for example, an Ethernet card, a serial communication device, for example, and RS-232 port, and/or a wireless interface device, for example, and 802.11 card. In another implementation, the input/output device 1540 can include driver devices configured to receive input data and send output data to other input/output devices, for example, keyboard, printer and display devices 1560. Other implementations, however, can also be used, such as mobile computing devices, mobile communication devices, and set-top box television client devices.

Although an example processing system has been described in FIG. 15, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for training a student neural network having a plurality of student neural network parameters, wherein the method comprises repeatedly performing operations including:

processing a training input using the student neural network to generate an output for the training input;

processing the student neural network output using a discriminative neural network to generate a discriminative score for the student neural network output,
  wherein the discriminative neural network is trained to process a network input to generate a discriminative score that characterizes a prediction for whether the network input was generated using a brain emulation neural network instead of the student neural network,
  wherein the brain emulation neural network has a brain emulation neural network architecture that has been determined by operations comprising:
    obtaining a three-dimensional (3D) synaptic resolution image of a brain of a biological organism;
    processing the 3D synaptic resolution image of the brain of the biological organism to generate a graph representing synaptic connectivity between neurons in the brain of the biological organism; and
    the graph comprises a plurality of nodes and edges, wherein each edge connects a pair of nodes, each node corresponds to a respective neuron in the brain of the biological organism, and each edge connecting a pair of nodes in the graph corresponds to a synaptic connection between a pair of neurons in the brain of the biological organism; and
    determining the brain emulation neural network architecture based on the graph derived from the 3D synaptic resolution image of the brain of the biological organism; and adjusting current values of the student neural network parameters using gradients of an objective function that depends on the discriminative score for the student neural network output.

2. The method of claim 1, wherein the student neural network is configured to process an input that comprises image data, video data, audio data, odor data, point cloud data, magnetic field data, or a combination thereof, to generate an output that comprises an embedding of the input.

3. The method of claim 1, wherein a neural network architecture of the student neural network is less complex than the neural network architecture of the brain emulation neural network.

4. The method of claim 1, wherein adjusting the current values of the student neural network parameters using gradients of an objective function that depends on the discriminative score for the student neural network output encourages the student neural network to generate outputs that are more likely to be misclassified by the discriminative neural network as having been generated by the brain emulation neural network.

5. The method of claim 1, wherein determining the brain emulation neural network architecture based on the graph derived from the 3D synaptic resolution image of the brain of the biological organism comprises:
  mapping each node in the graph to a corresponding artificial neuron in the neural network architecture of the brain emulation neural network; and
  for each edge in the graph:
    mapping the edge to a connection between a pair of artificial neurons in the neural network architecture of the brain emulation neural network that correspond to the pair of nodes in the graph that are connected by the edge.

6. The method of claim 1, wherein processing the 3D synaptic resolution image of the brain of the biological organism to generate the graph representing synaptic connectivity between neurons in the brain of the biological organism comprises:
  processing the 3D synaptic resolution image to segment:
    (i) a plurality of neurons shown in the 3D synaptic resolution image, and (ii) a plurality of synaptic connections between pairs of neurons in the 3D synaptic resolution image;
  mapping each segmented neuron in the 3D synaptic resolution image to a corresponding node in the graph; and
  mapping each segmented synaptic connection in the 3D synaptic resolution image to a corresponding edge in the graph.

7. The method of claim 1, wherein the 3D synaptic resolution image of the brain of the biological organism is generated using electron microscopy techniques.

8. The method of claim 1, wherein the graph represents synaptic connectivity between neurons in the brain of the biological organism that are predicted to have a particular function in the brain of the biological organism.

9. The method of claim 8, wherein the particular function is a visual data processing function, an audio data processing function, or an odor data processing function.

10. The method of claim 1, wherein values of the plurality of brain emulation neural network parameters are determined randomly prior to training of the student neural network and are not adjusted during the training of the student neural network.

11. The method of claim 1, wherein the biological organism is an animal.

12. The method of claim 11, wherein the biological organism is a fly.

13. A system comprising:
  one or more computers; and
  one or more storage devices communicatively coupled to the one or more computers, wherein the one or more storage devices store instructions that, when executed by the one or more computers, cause the one or more computers to perform operations for training a student neural network having a plurality of student neural network parameters, comprising repeatedly performing operations including:
    processing a training input using the student neural network to generate an output for the training input;
    processing the student neural network output using a discriminative neural network to generate a discriminative score for the student neural network output,
      wherein the discriminative neural network is trained to process a network input to generate a discriminative score that characterizes a prediction for whether the network input was generated using a brain emulation neural network instead of the student neural network,
      wherein the brain emulation neural network has a brain emulation neural network architecture that has been determined by operations comprising:
    obtaining a three-dimensional (3D) synaptic resolution image of a brain of a biological organism;
    processing the 3D synaptic resolution image of the brain of the biological organism to generate a graph representing synaptic connectivity between neurons in the brain of the biological organism; and
    the graph comprises a plurality of nodes and edges, wherein each edge connects a pair of nodes, each node corresponds to a respective neuron in the brain of the biological organism, and each edge connecting a pair of nodes in the graph corresponds to a synaptic connection between a pair of neurons in the brain of the biological organism; and
    determining the brain emulation neural network architecture based on the graph derived from the 3D synaptic resolution image of the brain of the biological organism; and
  adjusting current values of the student neural network parameters using gradients of an objective function that depends on the discriminative score for the student neural network output.

14. The system of claim 13, wherein the student neural network is configured to process an input that comprises image data, video data, audio data, odor data, point cloud data, magnetic field data, or a combination thereof, to generate an output that comprises an embedding of the input.

15. The system of claim 13, wherein a neural network architecture of the student neural network is less complex than the neural network architecture of the brain emulation neural network.

16. The system of claim 13, wherein adjusting the current values of the student neural network parameters using gradients of an objective function that depends on the discriminative score for the student neural network output encourages the student neural network to generate outputs that are more likely to be misclassified by the discriminative neural network as having been generated by the brain emulation neural network.

17. One or more non-transitory computer storage media storing instructions that when executed by one or more computers cause the one or more computers to perform operations for training a student neural network having a plurality of student neural network parameters, comprising repeatedly performing operations including:
  processing a training input using the student neural network to generate an output for the training input;
  processing the student neural network output using a discriminative neural network to generate a discriminative score for the student neural network output,
    wherein the discriminative neural network is trained to process a network input to generate a discriminative score that characterizes a prediction for whether the network input was generated using a brain emulation neural network instead of the student neural network, wherein the brain emulation neural network has a brain emulation neural network architecture that has been determined by operations comprising:

obtaining a three-dimensional (3D) synaptic resolution image of a brain of a biological organism;

processing the 3D synaptic resolution image of the brain of the biological organism to generate a graph representing synaptic connectivity between neurons in the brain of the biological organism; and the graph comprises a plurality of nodes and edges, wherein each edge connects a pair of nodes, each node corresponds to a respective neuron in the brain of the biological organism, and each edge connecting a pair of nodes in the graph corresponds to a synaptic connection between a pair of neurons in the brain of the biological organism; and determining the brain emulation neural network architecture based on the graph derived from the 3D synaptic resolution image of the brain of the biological organism; and adjusting current values of the student neural network parameters using gradients of an objective function that depends on the discriminative score for the student neural network output.

18. The non-transitory computer storage media of claim 17, wherein the student neural network is configured to process an input that comprises image data, video data, audio data, odor data, point cloud data, magnetic field data, or a combination thereof, to generate an output that comprises an embedding of the input.

19. The non-transitory computer storage media of claim 17, wherein a neural network architecture of the student neural network is less complex than the neural network architecture of the brain emulation neural network.

20. The non-transitory computer storage media of claim 17, wherein adjusting the current values of the student neural network parameters using gradients of an objective function that depends on the discriminative score for the student neural network output encourages the student neural network to generate outputs that are more likely to be misclassified by the discriminative neural network as having been generated by the brain emulation neural network.

* * * * *